US011405422B2

(12) United States Patent
Batta et al.

(10) Patent No.: US 11,405,422 B2
(45) Date of Patent: Aug. 2, 2022

(54) TRANSMITTING MULTIPLE COPIES OF AN ENCRYPTED PACKET VIA MULTIPLE TUNNELS BETWEEN A TRANSMITTING NETWORK DEVICE AND A RECEIVING NETWORK DEVICE

(71) Applicant: Juniper Networks, Inc., Sunnyvale, CA (US)

(72) Inventors: Sarvesh K. Batta, Bangalore (IN); Goutham Kondapavuluru, Bangalore (IN); Rajesh S, Bangalore (IN); Ranjan Sinha, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 354 days.

(21) Appl. No.: 16/794,356

(22) Filed: Feb. 19, 2020

(65) Prior Publication Data
US 2021/0258347 A1 Aug. 19, 2021

(51) Int. Cl.
*H04L 9/40* (2022.01)
*H04L 12/46* (2006.01)
*H04L 43/12* (2022.01)
*H04L 45/74* (2022.01)
*H04L 47/34* (2022.01)
*H04L 69/22* (2022.01)

(52) U.S. Cl.
CPC ........ *H04L 63/164* (2013.01); *H04L 12/4633* (2013.01); *H04L 43/12* (2013.01); *H04L 45/74* (2013.01); *H04L 47/34* (2013.01); *H04L 63/0428* (2013.01); *H04L 69/22* (2013.01)

(58) Field of Classification Search
CPC ... H04L 63/164; H04L 12/4633; H04L 43/12; H04L 45/74; H04L 47/34; H04L 63/0428; H04L 69/22
See application file for complete search history.

(56) References Cited

U.S. PATENT DOCUMENTS

2013/0191628 A1 7/2013 Nedeltchev
2019/0052558 A1* 2/2019 Mehta ..................... H04L 45/64
(Continued)

OTHER PUBLICATIONS

Partial European Search Report for Application No. EP20182645.0, dated Nov. 26, 2020, 11 pages.
(Continued)

*Primary Examiner* — Arvin Eskandarnia
(74) *Attorney, Agent, or Firm* — Harrity & Harrity, LLP

(57) ABSTRACT

A network device may receive, from a transmitting network device, a packet, wherein the packet includes a first outer internet protocol (IP) header, a Generic Routing Encapsulation (GRE) header, a second outer IP header, an Encapsulating Security Payload (ESP) header, and an inner packet, wherein the inner packet is encapsulated by the ESP header, the ESP header is encapsulated by the second outer IP header, the second outer IP header is encapsulated by the GRE header, and the GRE header is encapsulated by the first outer IP header. The network device may decapsulate the packet to remove the first outer IP header and the GRE header from the packet. The network device may decrypt, after decapsulating the packet, the packet to identify the inner packet. The network device may cause one or more actions associated with the inner packet to be performed.

20 Claims, 14 Drawing Sheets

(56) References Cited

U.S. PATENT DOCUMENTS

| | | | |
|---|---|---|---|
| 2019/0132297 A1 | 5/2019 | Ammanur et al. | |
| 2019/0312820 A1* | 10/2019 | Yu | H04L 45/74 |
| 2019/0319872 A1* | 10/2019 | Adhikari | H04L 45/38 |
| 2019/0334880 A1* | 10/2019 | Wang | H04L 63/20 |
| 2019/0372936 A1* | 12/2019 | Sullenberger | H04L 63/164 |
| 2020/0021516 A1* | 1/2020 | Bajaj | H04L 45/24 |
| 2020/0067831 A1* | 2/2020 | Spraggins | H04L 45/64 |
| 2020/0379839 A1* | 12/2020 | Savalle | G06F 11/0793 |

OTHER PUBLICATIONS

Extended European Search Report for Application No. EP20182645.0, dated Mar. 24, 2021, 11 pages.

\* cited by examiner

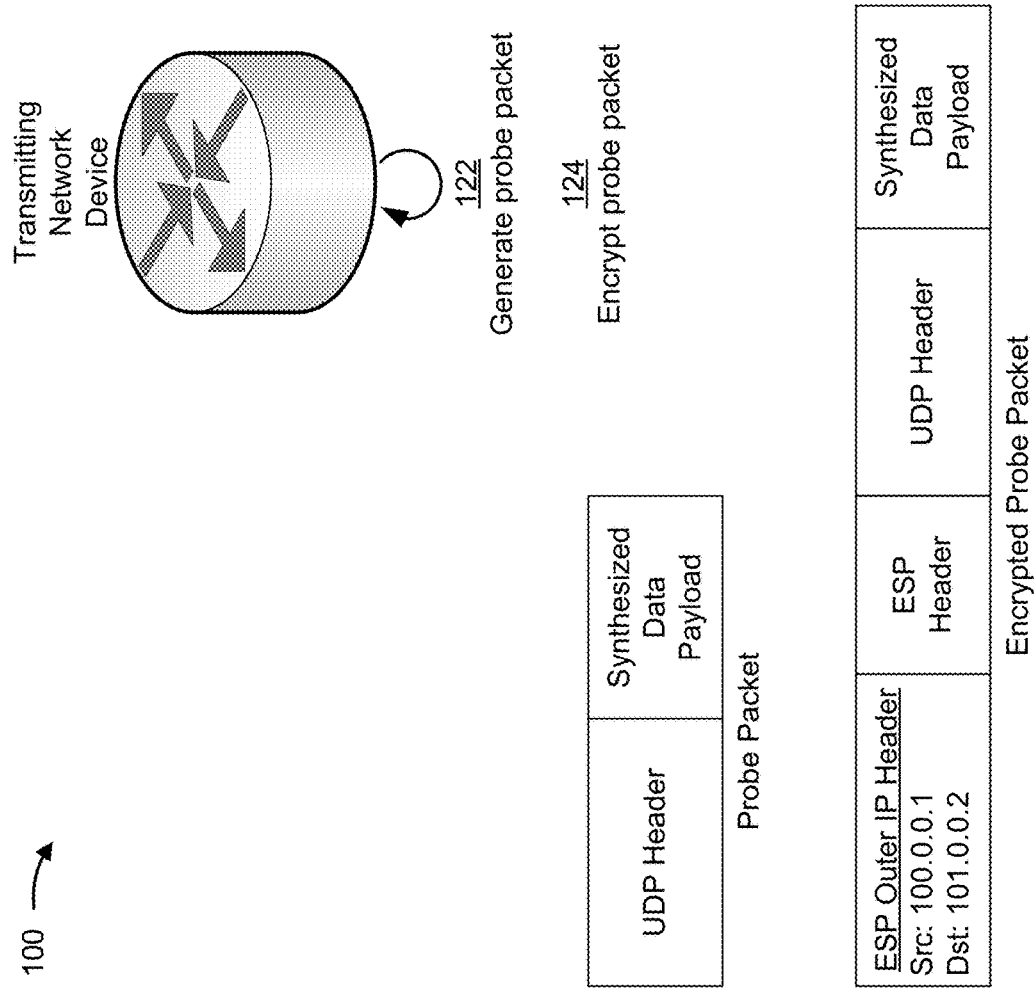

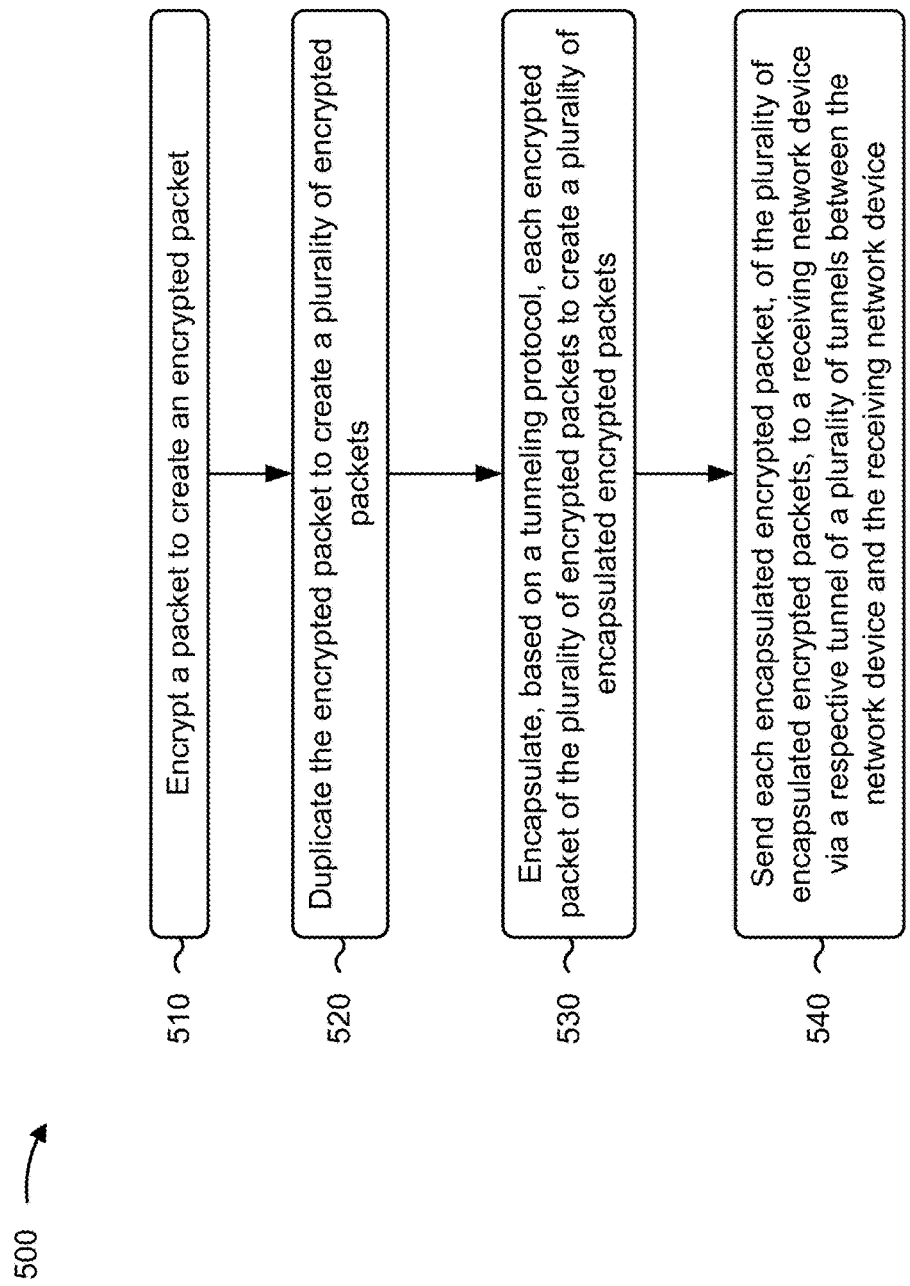

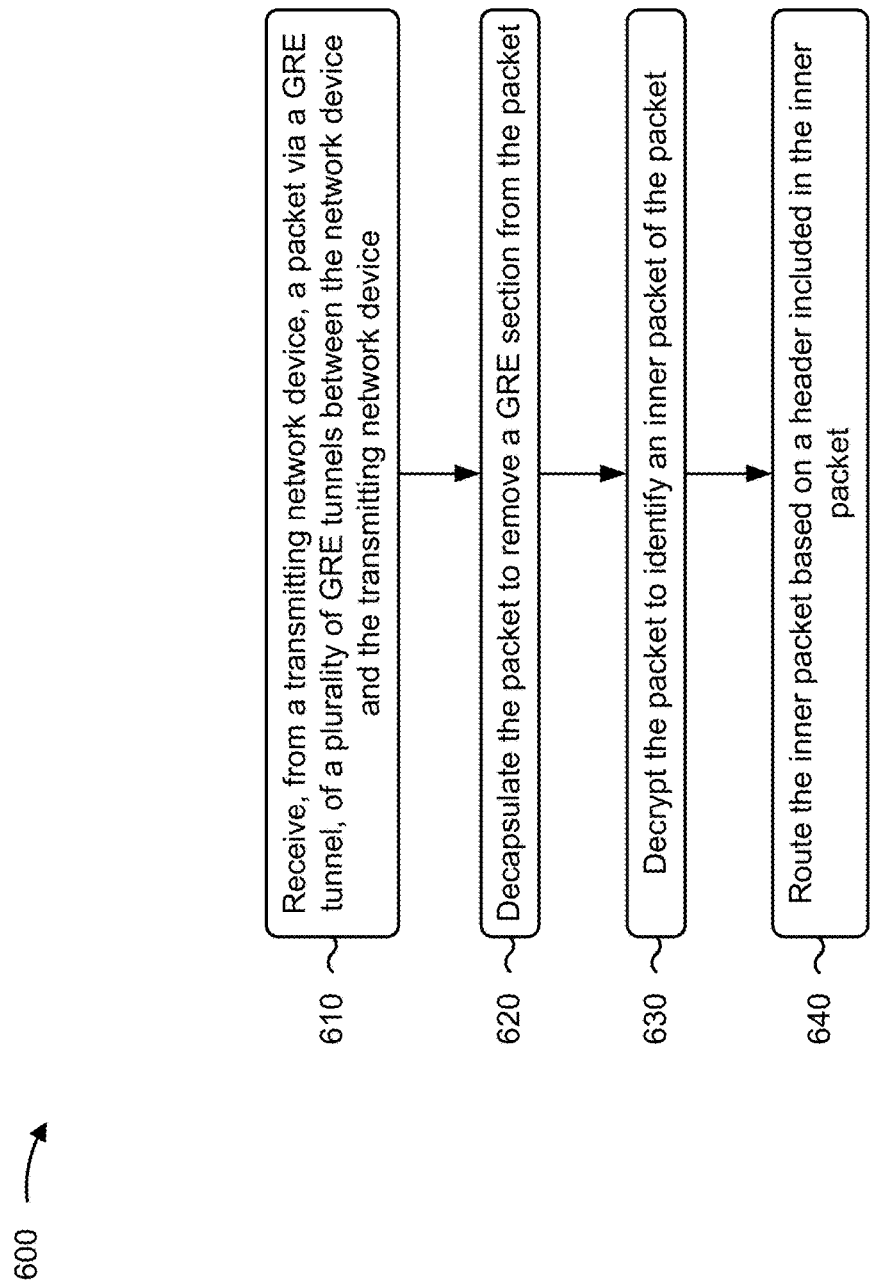

TRANSMITTING MULTIPLE COPIES OF AN ENCRYPTED PACKET VIA MULTIPLE TUNNELS BETWEEN A TRANSMITTING NETWORK DEVICE AND A RECEIVING NETWORK DEVICE

BACKGROUND

A network tunnel is a mechanism for secure transmission of private information through a public network in such a way that network devices of the public network are unaware of the private information. A tunneling protocol is a communications protocol that enables creation of a network tunnel. The tunneling protocol enables private information to be sent across a public network through a process called encapsulation.

SUMMARY

According to some implementations, a method may include receiving, by a network device and from a transmitting network device, a packet via a tunnel, of a plurality of tunnels between the network device and the transmitting network device, wherein the packet includes a first outer internet protocol (IP) header, a Generic Routing Encapsulation (GRE) header, a second outer IP header, an Encapsulating Security Payload (ESP) header that provides encryption of an inner packet of the packet, and the inner packet, wherein the inner packet is encapsulated by the ESP header, the ESP header is encapsulated by the second outer IP header, the second outer IP header is encapsulated by the GRE header, and the GRE header is encapsulated by the first outer IP header; decapsulating, by the network device, the packet to remove the first outer IP header and the GRE header from the packet; decrypting, by the network device and after decapsulating the packet, the packet to identify the inner packet; and causing, by the network device, one or more actions associated with the inner packet to be performed.

According to some implementations, a network device may include one or more memories; and one or more processors to: encrypt a packet to create an encrypted packet, wherein the encrypted packet includes an outer internet protocol (IP) header that includes a source address that identifies a virtual tunnel endpoint of the network device and a destination address that identifies a virtual tunnel endpoint of a receiving network device; duplicate the encrypted packet to create a plurality of encrypted packets; encapsulate, based on a tunneling protocol, each encrypted packet of the plurality of encrypted packets to create a plurality of encapsulated encrypted packets, wherein each encapsulated encrypted packet includes an additional outer IP header that includes a source address that identifies a physical tunnel endpoint of the network device and a destination address that identifies a physical tunnel endpoint of the receiving network device; and send each encapsulated encrypted packet, of the plurality of encapsulated encrypted packets, to the receiving network device via a respective tunnel of a plurality of tunnels between the network device and the receiving network device.

According to some implementations, a non-transitory computer-readable medium may store one or more instructions. The one or more instructions, when executed by one or more processors of a network device, may cause the one or more processors to: receive, from a transmitting network device, a packet via a Generic Routing Encapsulation (GRE) tunnel, of a plurality of GRE tunnels between the network device and the transmitting network device, wherein the packet includes an inner packet that is encapsulated by an Encapsulating Security Payload (ESP) section, which is encapsulated by a GRE section; decapsulate the packet to remove the GRE section from the packet; decrypt, after decapsulating the packet, the packet to identify the inner packet; and route the inner packet based on a header included in the inner packet.

BRIEF DESCRIPTION OF THE DRAWINGS

FIGS. 1A-1H are diagrams of one or more example implementations described herein.

FIGS. 4-6 are flowcharts of example processes for transmitting multiple copies of an encrypted packet via multiple tunnels between a transmitting network device and a receiving network device.

DETAILED DESCRIPTION

Figure 1A:
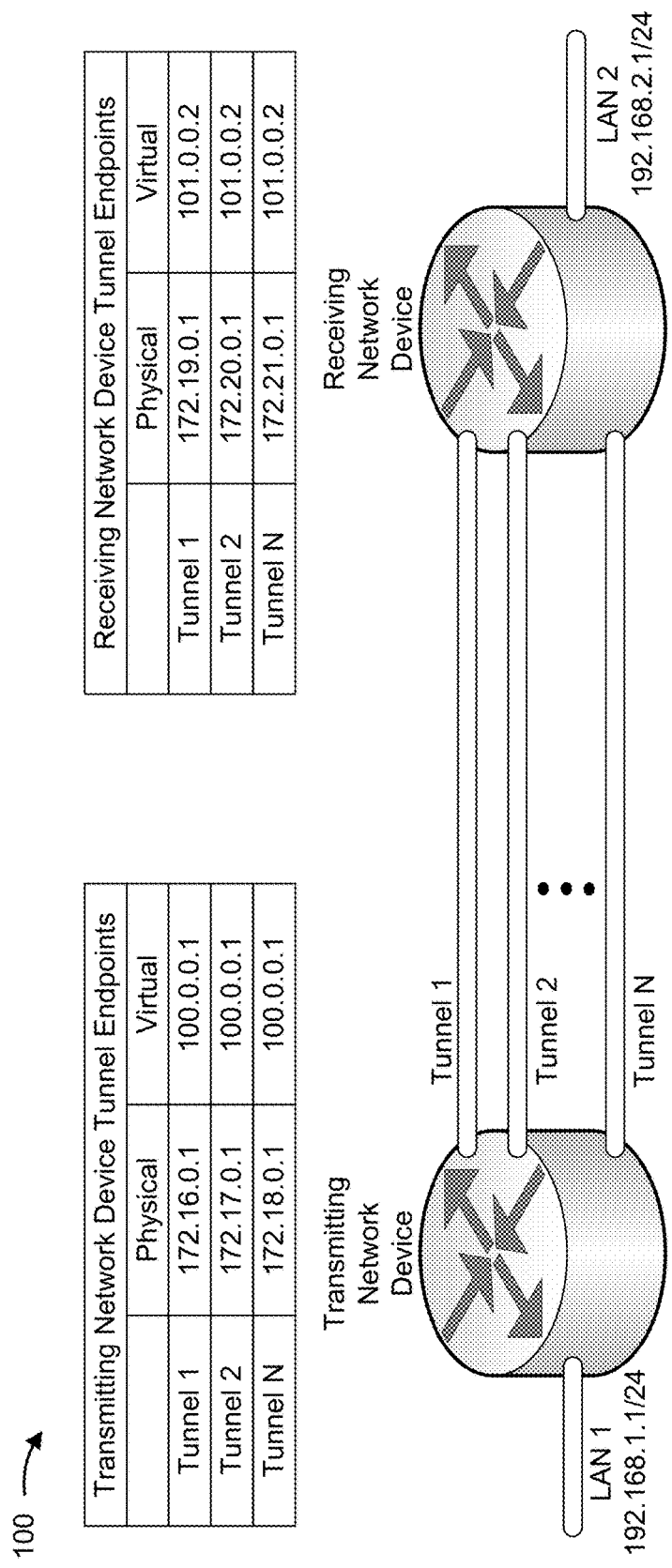

The following detailed description of example implementations refers to the accompanying drawings. The same reference numbers in different drawings may identify the same or similar elements.

In many cases, a plurality of tunnels may connect a first network device and a second network device. In some cases, the first network device may be configured to send a plurality of copies of the same packet to the second network device via the plurality of tunnels. For example, for some data sensitive applications (e.g., to minimize packet loss), the first network device may send individual copies of a data packet to the second network device via each of the plurality of tunnels. As another example, the first network device may send individual copies of probe packets (e.g., packets used to determine a status, a performance, and/or the like of the plurality of tunnels) to the second network device via each of the plurality of tunnels.

In some cases, prior to sending a copy of a packet via a tunnel, the first network device encapsulates the copy of the packet using a tunneling protocol, such as a Generic Routing Encapsulation (GRE) protocol, and then encrypts the copy of the packet using an encryption protocol, such as an Encapsulating Security Payload (ESP) protocol. The first network device may add one or more headers to the packet when encapsulating and encrypting the packet. Often, the one or more headers include public endpoint addresses associated with a particular tunnel, of the plurality of tunnels, upon which the copy of the packet is supposed to transmit from the first network device to the second network device. Consequently, each copy of the packet may include one or more headers that include endpoint addresses that are different than endpoint addresses included in one or more headers of other copies of the packet.

The first network device may respectively send each copy of the packet (e.g., after encapsulating and encrypting the copy of the packet) to the second network device via the plurality of tunnels. In many cases, the second network device may not know that the copies of the packet are copies of each other. Accordingly, the second network device may decrypt and/or decapsulate each copy of the packet to determine that the plurality of copies of the packet are duplicates of each other. This wastes computing resources (e.g., processing resources, memory resources, power resources, and/or the like) of the second network device to re-decrypt and/or re-decapsulate each copy of the packet to obtain the same copy of the packet.

According to some implementations described herein, a transmitting network device may encrypt a packet (e.g., using an ESP protocol) to create an encrypted packet, duplicate the encrypted packet to create a plurality of encrypted packets, and encapsulate each encrypted packet of the plurality of encrypted packets using a tunneling protocol (e.g., using a GRE tunneling protocol) to create a plurality of encapsulated encrypted packets. Further, in some implementations, when encrypting the packet, the transmitting network device may encapsulate the encrypted packet with an IP header (e.g., an ESP outer IP header) to indicate a particular virtual tunnel endpoint of the transmitting network device and a particular virtual tunnel endpoint of the receiving network device. Accordingly, in some implementations, each encapsulated encrypted packet includes the same encrypted packet that includes the IP header that indicates the same virtual tunnel endpoints.

In some implementations, the transmitting network device may send each encapsulated encrypted packet to a receiving network device via respective tunnels of a plurality of tunnels that connect the transmitting network device and the receiving network device. Accordingly, in some implementations, the receiving network device may determine that a first encapsulated encrypted packet is the same as a second encapsulated encrypted packet by decapsulating the first encapsulated encrypted packet to expose a first encrypted packet and decapsulating the second encapsulated encrypted packet to expose a second encrypted packet. In some implementations, the first encrypted packet and the second encrypted packet may have the same structure (e.g., each packet is encapsulated by the same IP header that indicates particular virtual tunnel endpoints) and the receiving network device may determine that the first encrypted packet and the second encrypted packet match each other (e.g., without having to decrypt both packets).

In this way, the transmitting network device can encrypt a packet and make multiple copies of a packet rather than individually encrypting multiple copies of the packet. Further, the receiving network device can determine that the copies of the packet are duplicates just by decapsulating the copies of the packet (e.g., without having to decrypt the copies of the packet). Accordingly, the receiving network device can decrypt just one of the copies of the packet to process the packet and discard and/or ignore the other copies of the packet. Thus, some implementations described herein eliminate unnecessary encryption and decryption steps by the transmitting network device and the receiving network device, and therefore conserve computing resources of the transmitting network device and the receiving network device that would otherwise be wasted performing the unnecessary encryption and decryption steps.

FIGS. 1A-1H are diagrams of one or more example implementations 100 described herein. As shown in FIGS. 1A-1H, example implementation(s) 100 may include a transmitting network device and a receiving network device. As shown in FIG. 1A, the transmitting network device may be associated with a first local area network (LAN) (shown as LAN 1, 192.168.1.1/24) and the receiving network device may be associated with a second LAN (shown as LAN 2, 192.168.2.1/24). For example, the transmitting network device may be a gateway to the first LAN that includes a first host (e.g., a first endpoint device that is a source or destination for network traffic) and the receiving network device may be a gateway to the second LAN that includes a second host (e.g., a second endpoint device that is a source or destination for network traffic).

In some implementations, a plurality of point-to-point connections between the transmitting network device and the receiving network device may be established using multiple network tunnels (e.g., Generic Routing Encapsulation (GRE) tunnels). For example, as shown in FIG. 1A, a plurality of tunnels (e.g., shown as tunnels 1-N, where N is greater than or equal to 2) connect the transmitting network device and the receiving network device. While example tunnels are described herein in reference to the GRE tunneling protocol, implementations described herein also apply to other tunneling protocols that may be used to configure point-to-point connections between network devices.

Each tunnel may have a tunnel endpoint associated with the transmitting network device and a tunnel endpoint associated with the receiving network device. In some implementations, a tunnel may have a physical tunnel endpoint (e.g., a physical IP address) associated with the transmitting network device and a physical tunnel endpoint associated with the receiving network device. For example, as shown in FIG. 1A, tunnel 1 has a physical tunnel endpoint (e.g., 172.16.0.1) associated with the transmitting network device and a physical tunnel endpoint (e.g., 172.19.0.1) associated with the receiving network device; tunnel 2 has a physical tunnel endpoint (e.g., 172.17.0.1) associated with the transmitting network device and a physical tunnel endpoint (e.g., 172.20.0.1) associated with the receiving network device; and tunnel N has a physical tunnel endpoint (e.g., 172.18.0.1) associated with the transmitting network device and a physical tunnel endpoint (e.g., 172.21.0.1) associated with the receiving network device. The physical tunnel endpoints may be public endpoints.

Additionally, or alternatively, a tunnel may have a virtual tunnel endpoint (e.g., a virtual IP address, such as for a loopback (LO) interface) associated with the transmitting network device and a virtual tunnel endpoint associated with the receiving network device. In some implementations, each tunnel, of the plurality of tunnels, may have the same virtual tunnel endpoint associated with the transmitting network device and may have the same virtual tunnel endpoint associated with the receiving network device. For example, as shown in FIG. 1A, tunnels 1-N have the same virtual tunnel endpoint (100.0.0.1) associated with the transmitting network device and the same virtual tunnel endpoint (101.0.0.2) associated with the receiving network device. The virtual tunnel endpoints may be private endpoints.

Figure 1B:
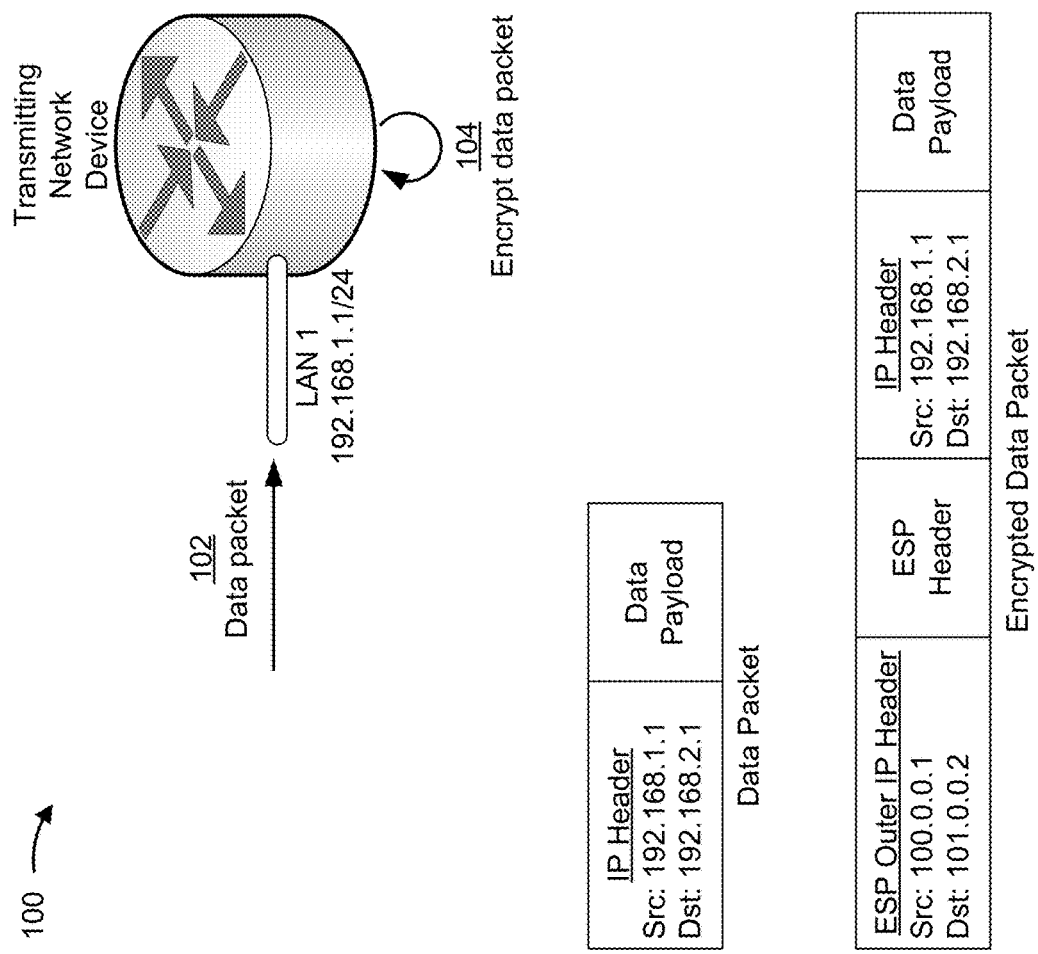

As shown in FIG. 1B, and by reference number 102, the transmitting network node may receive a data packet. For example, the transmitting network node may receive a data packet sent by the first host associated with the first LAN. As shown in FIG. 1B, the data packet may include an IP header and a data payload. The IP header may include a source address associated with the transmitting network device (e.g., that identifies the first LAN, 192.168.1.1) and a destination address associated with the receiving network device (e.g., that identifies the second LAN, 192.168.2.1).

As shown by reference number 104, the transmitting network device may encrypt the data packet to create an encrypted data packet. For example, the transmitting network device may encrypt the data packet using an Encapsulating Security Payload (ESP) protocol (e.g., ESP in transport mode, ESP in tunnel mode, and/or the like). In some implementations, the transmitting network device may encapsulate the data packet with an ESP header (e.g., that provides encryption of the data packet) to create the encrypted data packet. Additionally, or alternatively, the transmitting network device may encapsulate the encrypted data packet with an outer IP header (e.g., an ESP outer IP header) that includes a source address that identifies the virtual tunnel endpoint of the transmitting network device (e.g., 100.0.0.1, as shown in FIG. 1B) and/or a destination address that identifies the virtual tunnel endpoint of the receiving network device (e.g., 100.0.0.2, as shown in FIG. 1B). Accordingly, as shown in FIG. 1B, the transmitting network device may create an encrypted data packet that includes an inner packet (e.g., the data packet that includes the IP header and the data payload) that is encapsulated by an ESP header, which is encapsulated by the ESP outer IP header.

Figure 1C:
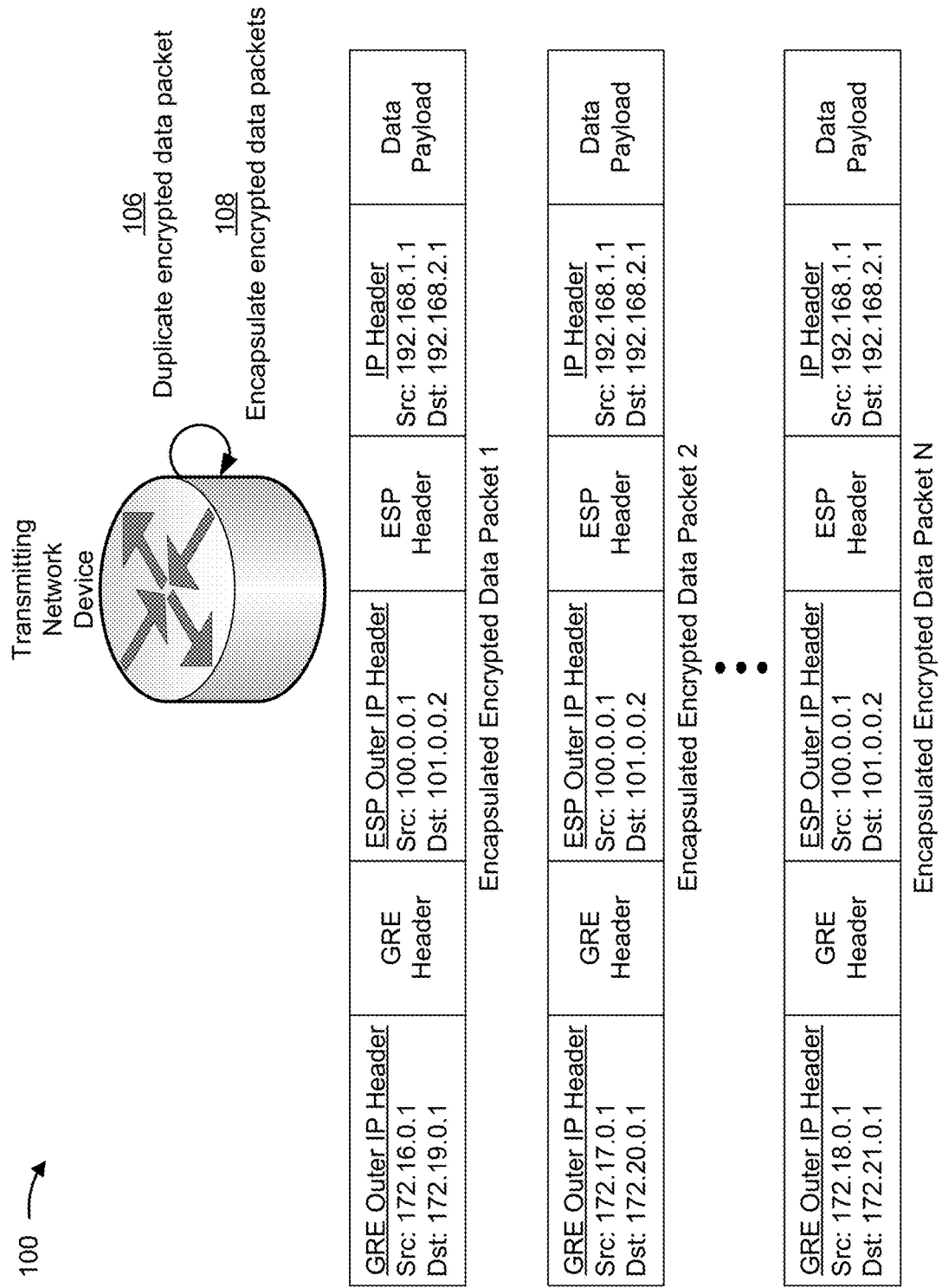

As shown in FIG. 1C and by reference number 106, the transmitting network device may duplicate the encrypted data packet to create a plurality of encrypted data packets. In some implementations, the transmitting network device may determine the number of tunnels that connect the transmitting network device and the receiving network device and may duplicate the encrypted data packet to create the same number of the encrypted data packets. For example, the transmitting network device may determine that N (e.g., where N is greater than or equal to 2) tunnels connect the transmitting network device and the receiving network device and may duplicate the encrypted data packet to create N encrypted data packets.

As shown by reference number 108, the transmitting network device may encapsulate the plurality of encrypted data packets. In some implementations, the transmitting network device may encapsulate each encrypted data packet using a tunneling protocol (e.g., the GRE tunneling protocol) to create a plurality of encapsulated encrypted packets (e.g., N encapsulated encrypted packets). For example, the transmitting network device may encapsulate an encrypted data packet with a GRE header to create an encapsulated encrypted data packet.

Additionally, or alternatively, the transmitting network device may encapsulate an encrypted data packet with an outer IP header (e.g., a GRE outer IP header) that includes a source address that identifies a physical tunnel endpoint of the network device and/or a destination address that identifies a physical tunnel endpoint of the receiving network device. For example, the transmitting network device may encapsulate a first encrypted data packet with a GRE outer IP header that includes a source address that identifies a physical tunnel endpoint of tunnel 1 (e.g., 172.16.0.1) that is associated with the transmitting network device and/or a destination address that identifies a physical tunnel endpoint of tunnel 1 (e.g., 172.19.0.1) associated with the receiving network device; may encapsulate a second encrypted data packet with a GRE outer IP header that includes a source address that identifies a physical tunnel endpoint of tunnel 2 (e.g., 172.17.0.1) that is associated with the transmitting network device and/or a destination address that identifies a physical tunnel endpoint of tunnel 2 (e.g., 172.20.0.1) associated with the receiving network device; and/or may encapsulate an $N^{th}$ encrypted data packet with a GRE outer IP header that includes a source address that identifies a physical tunnel endpoint of tunnel N (e.g., 172.18.0.1) that is associated with the transmitting network device and/or a destination address that identifies a physical tunnel endpoint of tunnel N (e.g., 172.21.0.1) associated with the receiving network device.

Accordingly, as shown in FIG. 1C, the transmitting network device may create a plurality of encapsulated encrypted data packets (shown as encapsulated encrypted data packets 1-N), where each encapsulated encrypted data packet includes an inner packet (e.g., a data packet that includes an IP header and a data payload), where the inner packet is encapsulated by an ESP header, the ESP header is encapsulated by an ESP outer IP header, the ESP outer IP header is encapsulated by a GRE header, and the GRE header is encapsulated by a GRE outer IP header.

Figure 1D:
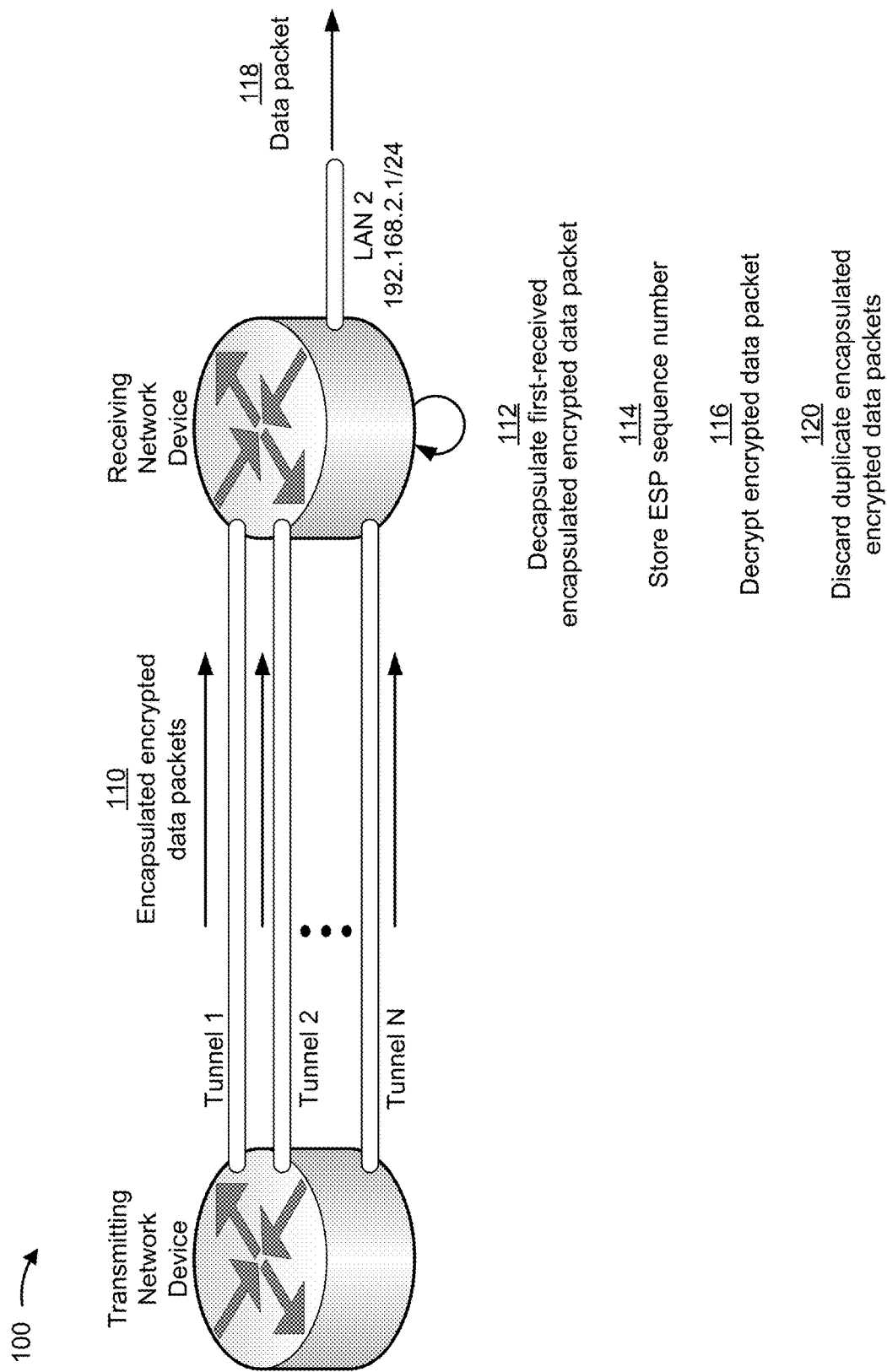

As shown in FIG. 1D and by reference number 110, the transmitting network device may send (e.g., route, transmit, and/or the like) the plurality of encapsulated encrypted data packets to the receiving network device. In some implementations, the transmitting network device may send each encapsulated encrypted data packet to the receiving network device via a respective tunnel (e.g., a corresponding tunnel) of the plurality of tunnels between the receiving network device. For example, the transmitting network device may send encapsulated encrypted data packet 1 (e.g., that includes a GRE outer IP header that indicates physical tunnel endpoints of tunnel 1) to the receiving network device via tunnel 1; may send encapsulated encrypted data packet 2 (e.g., that includes a GRE outer IP header that indicates physical tunnel endpoints of tunnel 2) to the receiving network device via tunnel 2; and/or may send encapsulated encrypted data packet N (e.g., that includes a GRE outer IP header that indicates physical tunnel endpoints of tunnel N) to the receiving network device via tunnel N.

In some implementations, the receiving network device may receive, via a particular tunnel of the plurality of tunnels, one of the encapsulated encrypted data packets (hereinafter referred to as "the first-received encapsulated encrypted data packet") prior to receiving any other encapsulated encrypted data packet of the plurality of encapsulated encrypted data packets (e.g., due to tunnel latency issues, tunnel traffic, and/or the like). In some implementations, as shown by reference number 112, the receiving network device may decapsulate the first-received encapsulated encrypted data packet. For example, the receiving network device may remove a GRE outer IP header and/or a GRE header from the first-received encapsulated encrypted data packet. Accordingly, the receiving network device may decapsulate the first-received encapsulated encrypted data packet to expose and/or identify an encrypted data packet included in the first-received encapsulated encrypted data packet. Additionally, or alternatively, the receiving network device may not decapsulate the first-received encapsulated encrypted data packet.

In some implementations, the receiving network device may process (e.g., parse) an ESP header of the encrypted data packet (e.g., that was exposed after the receiving network device decapsulated the first-received encapsulated encrypted data packet) to identify a sequence number associated with the ESP header (e.g., a counter value). Additionally, or alternatively, in some implementations when the receiving network device does not decapsulate the first-received encapsulated encrypted data packet, the receiving network device may process the ESP header of the first-received encapsulated encrypted data packet to identify the sequence number associated with the ESP header. As shown by reference number 114, the receiving network device may cause the sequence number to be stored in a data structure (e.g., a data structure that is included in the receiving network device and/or accessible to the receiving network device). For example, the receiving network device may send the sequence number to the data structure to cause the data structure to include the sequence number in an entry and to cause the data structure to store the entry in the data structure. The data structure may store the entry in the data structure for a period of time (e.g., 100 milliseconds, 1 second, 10 seconds and/or the like) before deleting the entry. Additionally, or alternatively, the data structure may store the entry in the data structure while the sequence number satisfies (e.g., is greater than) a threshold (e.g., a threshold sequence number). Otherwise, the data structure may delete the entry. In this way, the data structure ensures that only current sequence numbers are stored in the data structure.

As shown by reference number 116, the receiving network device may decrypt the encrypted data packet. For example, the receiving network device may decrypt the encrypted packet using the ESP protocol that was used by the transmitting network device to encrypt the data packet (e.g., as described herein in relation to FIG. 1B and reference number 104). In some implementations, the receiving network device may process the ESP header of the encrypted data packet to identify the ESP protocol and may decrypt the encrypted data packet using the ESP protocol. In some implementations, when decrypting the encrypted data packet, the receiving network device may remove an ESP outer IP header and/or the ESP header from the encrypted data packet. Accordingly, the receiving network device may decrypt the encrypted data packet to expose and/or identify a data packet (e.g., an inner packet of the encrypted data packet).

In some implementations, the receiving network device may process the data packet (e.g., that was exposed after the receiving network device decrypted the encrypted data packet) to identify an IP header of the data packet and/or a data payload of the data packet. The receiving network device may parse the IP header to identify and/or determine a destination address of the IP header (e.g., that identifies the second LAN, 192.168.2.1). As shown by reference number 118, the receiving network device may send (e.g. route, transmit, and/or the like) the data packet to the destination address of the IP header (e.g., to the second host associated with the second LAN).

Additionally, or alternatively, the receiving network device may receive, via a different tunnel of the plurality of tunnels, an additional encapsulated encrypted data packet, of the plurality of encapsulated encrypted data packets, after receiving the first-received encapsulated encrypted data packet. The additional encapsulated encrypted data packet may have a same or similar structure as the first-received encapsulated encrypted data packet. For example, the additional encapsulated encrypted data packet may include an inner packet (e.g., a data packet that includes an IP header and a data payload), where the inner packet is encapsulated by an ESP header, the ESP header is encapsulated by an ESP outer IP header, the ESP outer IP header is encapsulated by a GRE header, and the GRE header is encapsulated by a GRE outer IP header In some implementations, the receiving network device may decapsulate the additional encapsulated encrypted data packet in a similar manner as described herein in relation to reference number 112. For example, the receiving network device may remove the GRE outer IP header and/or the GRE header from the additional encapsulated encrypted data packet. Accordingly, the receiving network device may decapsulate the additional encapsulated encrypted data packet to expose and/or identify an encrypted data packet included in the additional encapsulated encrypted data packet. Additionally, or alternatively, the receiving network device may not decapsulate the additional encapsulated encrypted data packet.

In some implementations, the receiving network device may process (e.g., parse) the ESP header of the encrypted data packet (e.g., that was exposed after the receiving network device decapsulated the additional encapsulated encrypted data packet) to identify a sequence number associated with the ESP header. Additionally, or alternatively, in some implementations when the receiving network device does not decapsulate the additional encapsulated encrypted data packet, the receiving network device may process the ESP header of the additional encapsulated encrypted data packet to identify the sequence number associated with the ESP header. The receiving network device may obtain the sequence number associated with the ESP header of the first-received encapsulated encrypted data packet from the data structure (e.g., the receiving network device may retrieve the entry that includes the sequence number associated with the ESP header of the first-received encapsulated encrypted data packet from the data structure). The receiving network device may compare the sequence number associated with the ESP header of the additional encapsulated encrypted data packet and the sequence number associated with the first-received encapsulated encrypted data packet. When the sequence numbers match, the receiving network device may determine that the encrypted data packet of the additional encapsulated encrypted data packet matches (e.g., is the same as, is a copy of, is a duplicate of, and/or the like) the encrypted data packet of the first-received encapsulated encrypted data packet and/or that the data packet of the additional encapsulated encrypted data packet matches (e.g., is the same as, is a copy of, is a duplicate of, and/or the like) the data packet of the first-received encapsulated encrypted data packet. Accordingly, as shown by reference number 120, the receiving network device may cause the encrypted data packet of the additional encapsulated encrypted data packet to be discarded.

While some example implementations described herein in relation to FIGS. 1B-1D are directed to processing, transmitting, and/or receiving data packets, contemplated implementations include processing, transmitting, and/or receiving any kind of packet that can be processed, transmitted, and/or received by a network device. For example, some example implementations described herein in relation FIGS. 1E-1H are directed to processing, transmitting, and/or receiving probe packets.

As shown in FIG. 1E and by reference number 122, the transmitting network device may generate a probe packet. The probe packet may include a synthesized data payload and a user datagram protocol (UDP) header. The synthesized data payload may include synthesized data to approximate a size and/or content of a data payload of a data packet. The UDP header may designate a particular port (e.g., port 3600) to indicate that the probe packet is a probe packet (e.g., to be sent to the receiving network device and routed back to the transmitting network device).

As shown by reference number 124, the transmitting network device may encrypt the probe packet to create an encrypted probe packet (e.g., in a similar manner as described herein in relation to FIG. 1B and reference number 104). For example, the transmitting network device may encrypt the probe packet using an ESP protocol, which may cause the probe packet to be encapsulated with an ESP header. Additionally, or alternatively, the transmitting network device may encapsulate the encrypted probe packet with an outer IP header (e.g., an ESP outer IP header) that includes a source address that identifies the virtual tunnel endpoint of the transmitting network device (e.g., 100.0.0.1, as shown in FIG. 1E) and/or a destination address that identifies the virtual tunnel endpoint of the receiving network device (e.g., 100.0.0.2, as shown in FIG. 1E). Accordingly, as shown in FIG. 1E, the transmitting network device may create an encrypted probe packet that includes an inner packet (e.g., the probe packet that includes the synthesized data payload and the UDP header) that is encapsulated by an ESP header, which is encapsulated by the ESP outer IP header.

Figure 1F:
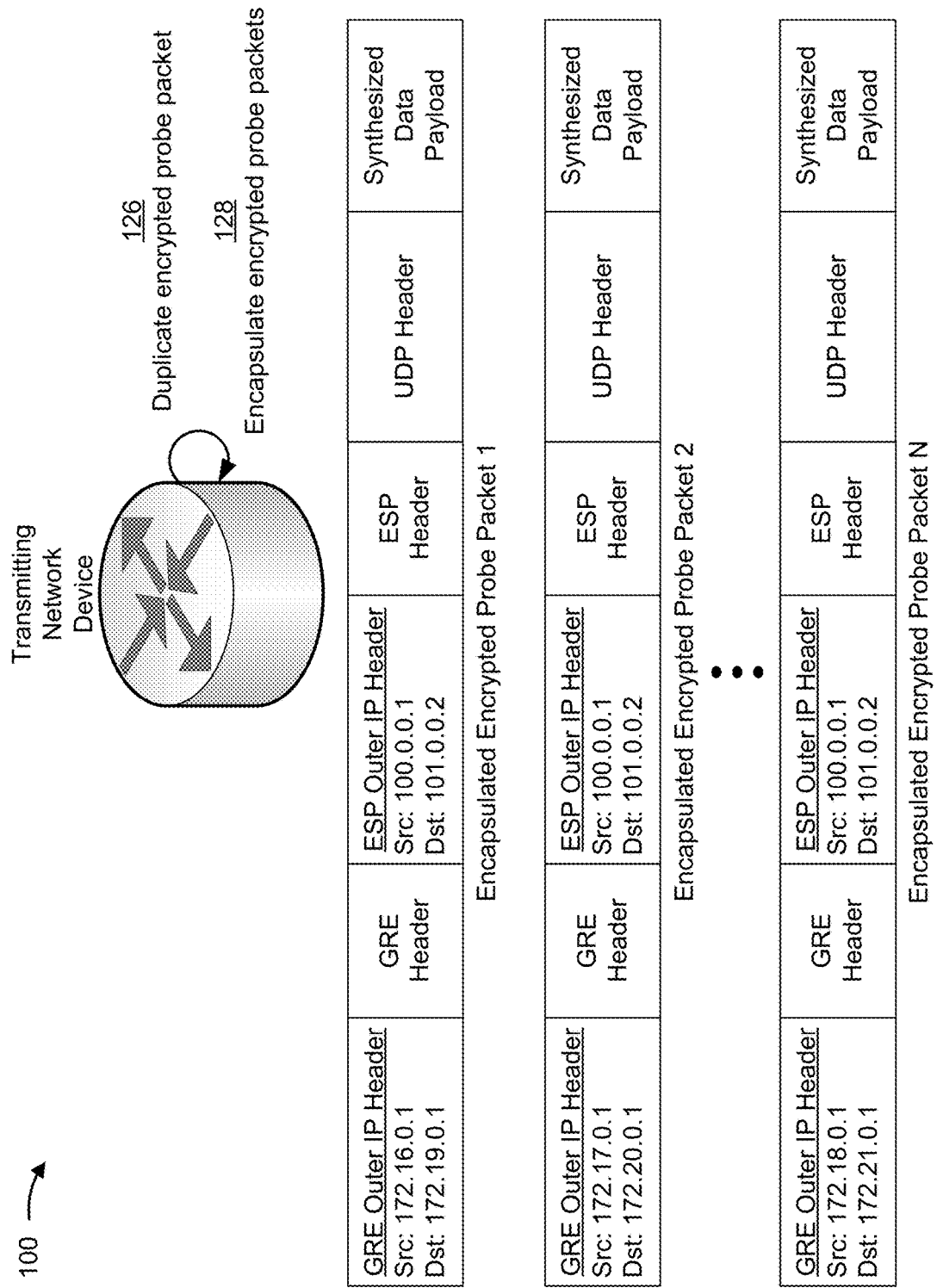

As shown in FIG. 1F and by reference number 126, the transmitting network device may duplicate the encrypted probe packet to create a plurality of encrypted probe packets (e.g., in a similar manner as described herein in relation to FIG. 1C and reference number 106). For example, the transmitting network device may determine that N (e.g., where N is greater than or equal to 2) tunnels connect the transmitting network device and the receiving network device, and may duplicate the encrypted probe packet to create N encrypted probe packets.

As shown by reference number 128, the transmitting network device may encapsulate the plurality of encrypted probe packets (e.g., in a similar manner as described herein in relation to FIG. 1C and reference number 108). In some implementations, the transmitting network device may encapsulate each encrypted probe packet using a tunneling protocol (e.g., the GRE tunneling protocol) to create a plurality of encapsulated encrypted packets (e.g., N encapsulated encrypted packets). For example, the transmitting network device may encapsulate an encrypted probe packet with a GRE header to create an encapsulated encrypted probe packet.

Additionally, or alternatively, the transmitting network device may encapsulate an encrypted probe packet with an outer IP header (e.g., a GRE outer IP header) that includes a source address that identifies a physical tunnel endpoint of the network device and/or a destination address that identifies a physical tunnel endpoint of the receiving network device. For example, the transmitting network device may encapsulate a first encrypted probe packet with a GRE outer IP header that includes a source address that identifies a physical tunnel endpoint of tunnel 1 (e.g., 172.16.0.1) that is associated with the transmitting network device and/or a destination address that identifies a physical tunnel endpoint of tunnel 1 (e.g., 172.19.0.1) associated with the receiving network device; may encapsulate a second encrypted probe packet with a GRE outer IP header that includes a source address that identifies a physical tunnel endpoint of tunnel 2 (e.g., 172.17.0.1) that is associated with the transmitting network device and/or a destination address that identifies a physical tunnel endpoint of tunnel 2 (e.g., 172.20.0.1) associated with the receiving network device; and/or may encapsulate an $N^{th}$ encrypted probe packet with a GRE outer IP header that includes a source address that identifies a physical tunnel endpoint of tunnel N (e.g., 172.18.0.1) that is associated with the transmitting network device and/or a destination address that identifies a physical tunnel endpoint of tunnel N (e.g., 172.21.0.1) associated with the receiving network device.

Accordingly, as shown in FIG. 1F, the transmitting network device may create a plurality of encapsulated encrypted probe packets (shown as encapsulated encrypted probe packets 1-N), where each encapsulated encrypted probe packet includes an inner packet (e.g., a probe packet that includes a UDP header and a synthesized data payload), where the inner packet is encapsulated by an ESP header, the ESP header is encapsulated by an ESP outer IP header, the ESP outer IP header is encapsulated by a GRE header, and the GRE header is encapsulated by a GRE outer IP header.

Figure 1G:
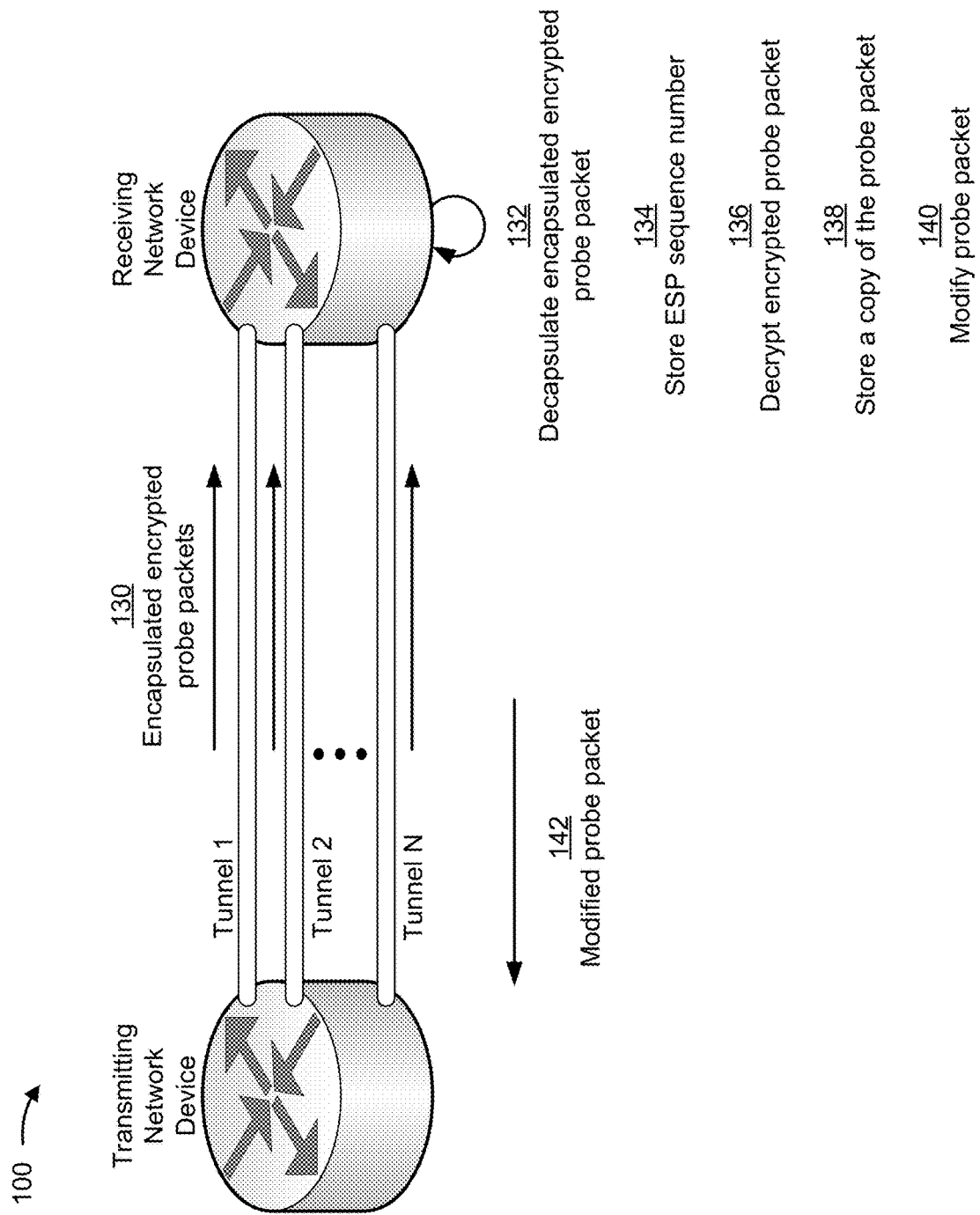

As shown in FIG. 1G and by reference number 130, the transmitting network device may send the plurality of encapsulated encrypted probe packets to the receiving network device (e.g., in a similar manner as described herein in relation to FIG. 1D and reference number 110). In some implementations, the transmitting network device may send each encapsulated encrypted probe packet to the receiving network device via a respective tunnel (e.g., a corresponding tunnel) of the plurality of tunnels between the receiving network device.

In some implementations, the receiving network device may receive, via a particular tunnel of the plurality of tunnels, one of the encapsulated encrypted probe packets (hereinafter referred to as "the first-received encapsulated encrypted probe packet") prior to receiving any other encapsulated encrypted probe packet of the plurality of encapsulated encrypted probe packets. As shown by reference number 132, the receiving network device may decapsulate the first-received encapsulated encrypted probe packet in a similar manner as described herein in relation to FIG. 1D and reference number 112. For example, the receiving network device may remove a GRE outer IP header and/or a GRE header from the first-received encapsulated encrypted probe packet. Accordingly, the receiving network device may decapsulate the first-received encapsulated encrypted probe packet to expose and/or identify an encrypted probe packet included in the first-received encapsulated encrypted probe packet. Additionally, or alternatively, the receiving network device may not decapsulate the first-received encapsulated encrypted probe packet.

In some implementations, the receiving network device may process (e.g., parse) an ESP header of the encrypted probe packet (e.g., that was exposed after the receiving network device decapsulated the first-received encapsulated encrypted probe packet) to identify a sequence number associated with the ESP header. Additionally, or alternatively, in some implementations when the receiving network device does not decapsulate the first-received encapsulated encrypted probe packet, the receiving network device may process the ESP header of the first-received encapsulated encrypted probe packet to identify the sequence number associated with the ESP header. As shown by reference number 134, the receiving network device may cause the sequence number to be stored in a data structure (e.g., the data structure that is included in the receiving network device and/or accessible to the receiving network device). For example, the receiving network device may send the sequence number to the data structure to cause the data structure to include the sequence number in an entry and to cause the data structure to store the entry in the data structure.

As shown by reference number 136, the receiving network device may decrypt the encrypted probe packet. For example, the receiving network device may decrypt the encrypted packet using the ESP protocol that was used by the transmitting network device to encrypt the probe packet (e.g., as described herein in relation to FIG. 1E and reference number 124). In some implementations, the receiving network device may process the ESP header of the encrypted probe packet to identify the ESP protocol and may decrypt the encrypted probe packet using the ESP protocol. In some implementations, when decrypting the encrypted probe packet, the receiving network device may remove an ESP outer IP header and/or the ESP header from the encrypted probe packet. Accordingly, the receiving network device may decrypt the encrypted probe packet to expose and/or identify a probe packet (e.g., an inner packet of the encrypted probe packet).

As shown by reference number 138, the receiving network device may copy the probe packet (e.g., that was exposed after the receiving network device decrypted the encrypted probe packet) and may cause the copy of the probe packet to be stored in the data structure. For example, the receiving network device may send the copy of the probe packet to the data structure to cause the data structure to include the copy of the probe packet in the entry that includes the sequence number in the data structure. The data structure may store the entry in the data structure for a period of time (e.g., 100 milliseconds, 1 second, 10 seconds and/or the like) before deleting the entry. Additionally, or alternatively, the data structure may store the entry in the data structure while the sequence number satisfies (e.g., is greater than) a threshold (e.g., a threshold sequence number). Otherwise, the data structure may delete the entry. In this way, the data structure ensures that only current sequence numbers and current copies of probe packets are stored in the data structure.

As shown by reference number 140, the receiving network device may modify the probe packet. For example, the receiving network device may process the probe packet to identify a synthesized data payload of the data packet and may update the synthesized data payload of the probe packet. The receiving network device may update the synthesized data payload to include information concerning a time at which the receiving network device received the first-received encapsulated encrypted probe packet and/or information concerning a time at which the receiving network device is to send (e.g., route, transmit, and/or the like) the probe packet (e.g., to the transmitting network device).

As shown by reference number 142, the receiving network device may send the probe packet (e.g., after modifying the probe packet) to the transmitting network device. For example, the receiving network device may process the probe packet to identify a UDP header of the probe packet (e.g., that indicates that the receiving network device is to send (e.g., transmit, route, and/or the like) the probe packet to the transmitting network device). The receiving network device may send, based on the UDP header, the probe packet to the transmitting network device via the particular tunnel, of the plurality of tunnels, that transmitted the first-received encapsulated encrypted probe packet from the transmitting network device to the receiving network device.

Additionally, or alternatively, the receiving network device may receive, via a different tunnel of the plurality of tunnels, an additional encapsulated encrypted probe packet, of the plurality of encapsulated encrypted probe packets, after receiving the first-received encapsulated encrypted probe packet. The additional encapsulated encrypted probe packet may have a same or similar structure as the first-received encapsulated encrypted probe packet. For example, the additional encapsulated encrypted probe packet may include an inner packet (e.g., a probe packet that includes an IP header and a data payload), where the inner packet is encapsulated by an ESP header, the ESP header is encapsulated by an ESP outer IP header, the ESP outer IP header is encapsulated by a GRE header, and the GRE header is encapsulated by a GRE outer IP header.

In some implementations, the receiving network device may decapsulate the additional encapsulated encrypted probe packet in a similar manner as described herein in relation to reference number 132. For example, the receiving network device may remove the GRE outer IP header and/or the GRE header from the additional encapsulated encrypted probe packet. Accordingly, the receiving network device may decapsulate the additional encapsulated encrypted probe packet to expose and/or identify an encrypted probe packet included in the additional encapsulated encrypted probe packet. Additionally, or alternatively, the receiving network device may not decapsulate the additional encapsulated encrypted probe packet.

Figure 1H:
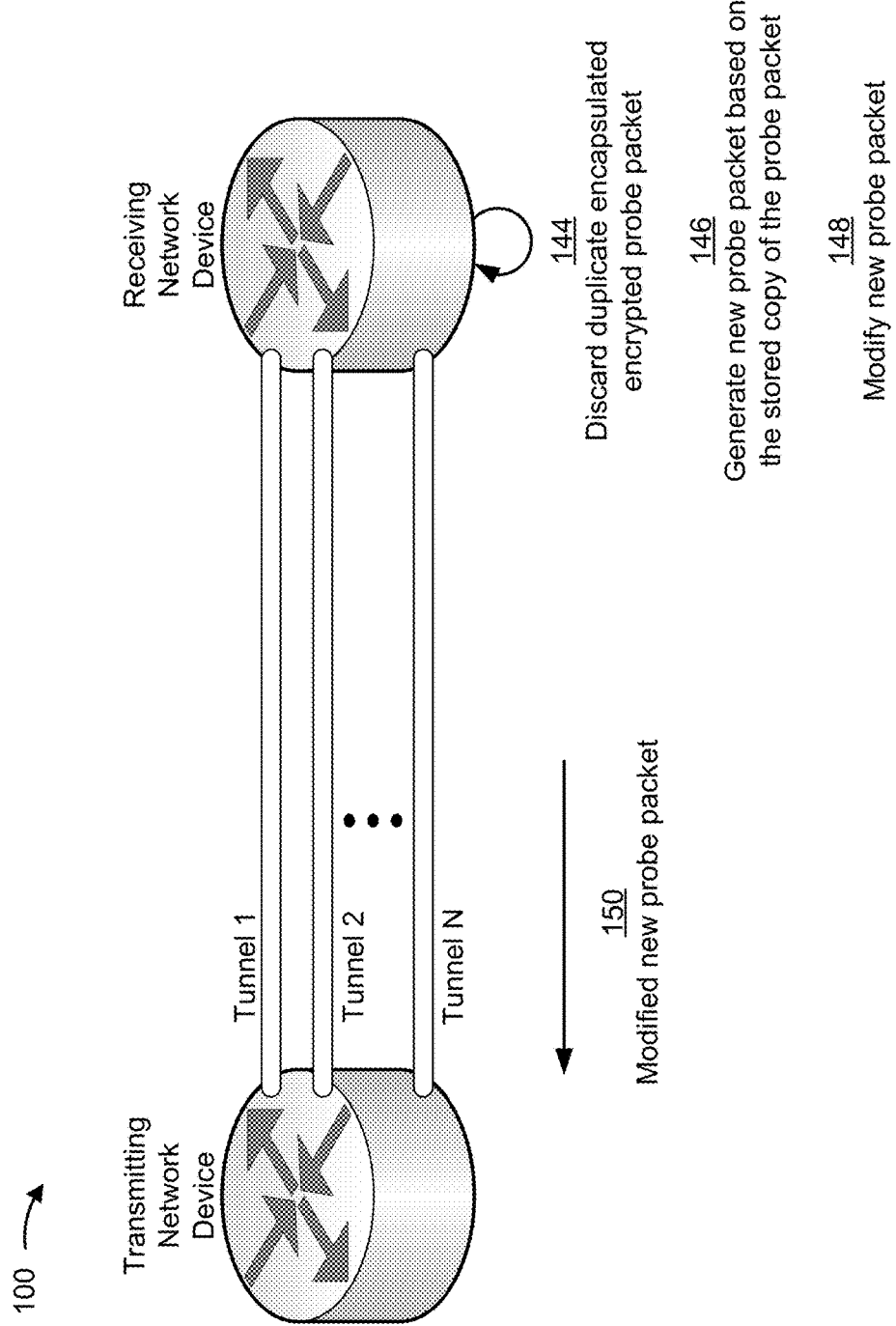

In some implementations, the receiving network device may process (e.g., parse) the ESP header of the encrypted probe packet (e.g., that was exposed after the receiving network device decapsulated the additional encapsulated encrypted probe packet) to identify a sequence number associated with the ESP header. Additionally, or alternatively, in some implementations when the receiving network device does not decapsulate the additional encapsulated encrypted probe packet, the receiving network device may process the ESP header of the additional encapsulated encrypted probe packet to identify the sequence number associated with the ESP header. The receiving network device may obtain the sequence number associated with the ESP header of the first-received encapsulated encrypted probe packet from the data structure (e.g., the receiving network device may retrieve the entry that includes the sequence number associated with the ESP header of the first-received encapsulated encrypted probe packet from the data structure). The receiving network device may compare the sequence number associated with the ESP header of the additional encapsulated encrypted probe packet and the sequence number associated with the first-received encapsulated encrypted probe packet. When the sequence numbers match, the receiving network device may determine that the encrypted probe packet of the additional encapsulated encrypted probe packet matches (e.g., is the same as, is a copy of, is a duplicate of, and/or the like) the encrypted probe packet of the first-received encapsulated encrypted probe packet and/or that the probe packet of the additional encapsulated encrypted probe packet matches (e.g., is the same as, is a copy of, is a duplicate of, and/or the like) the probe packet of the first-received encapsulated encrypted probe packet. Accordingly, as shown in FIG. 1H and by reference number 144, the receiving network device may cause the encrypted probe packet of the additional encapsulated encrypted probe packet to be discarded.

As shown by reference number 146, the receiving network device may generate a new probe packet (e.g., after causing the encrypted probe packet of the additional encapsulated encrypted probe packet to be discarded). In some implementations, the receiving network device may generate the new probe packet based on the copy of the probe packet stored in the data structure. For example, the receiving network device may duplicate the copy of the probe packet stored in the data structure to generate the new probe packet. As another example, the receiving network device may remove the copy of the probe packet from the data structure (e.g., from the entry stored in the data structure that includes the copy of the probe packet) and cause the copy of the probe packet to be the new probe packet. The receiving network device may then cause the entry to be deleted from the data structure.

As shown by reference number 148, the receiving network device may modify the new probe packet. For example, the receiving network device may update a synthesized data payload of the probe packet. The receiving network device may update the synthesized data payload to include information concerning when the receiving network device received the additional encapsulated encrypted probe packet and/or information concerning when the receiving network device is to send (e.g., route, transmit, and/or the like) the new probe packet (e.g., to the transmitting network device).

As shown by reference number 150, the receiving network device may send the modified new probe packet (e.g., after modifying the new probe packet) to the transmitting network device. For example, the receiving network device may process the new probe packet to identify a UDP header of the new probe packet (e.g., that indicates that the receiving network device is to send (e.g., transmit, route, and/or the like) the new probe packet to the transmitting network device). The receiving network device may send, based on the UDP header, the new probe packet to the transmitting network device via the different tunnel, of the plurality of tunnels, that transmitted the additional encapsulated encrypted probe packet from the transmitting network device to the receiving network device.

As indicated above, FIGS. 1A-1H are provided merely as one or more examples. Other examples may differ from what is described with regard to FIGS. 1A-1H.

Figure 2:
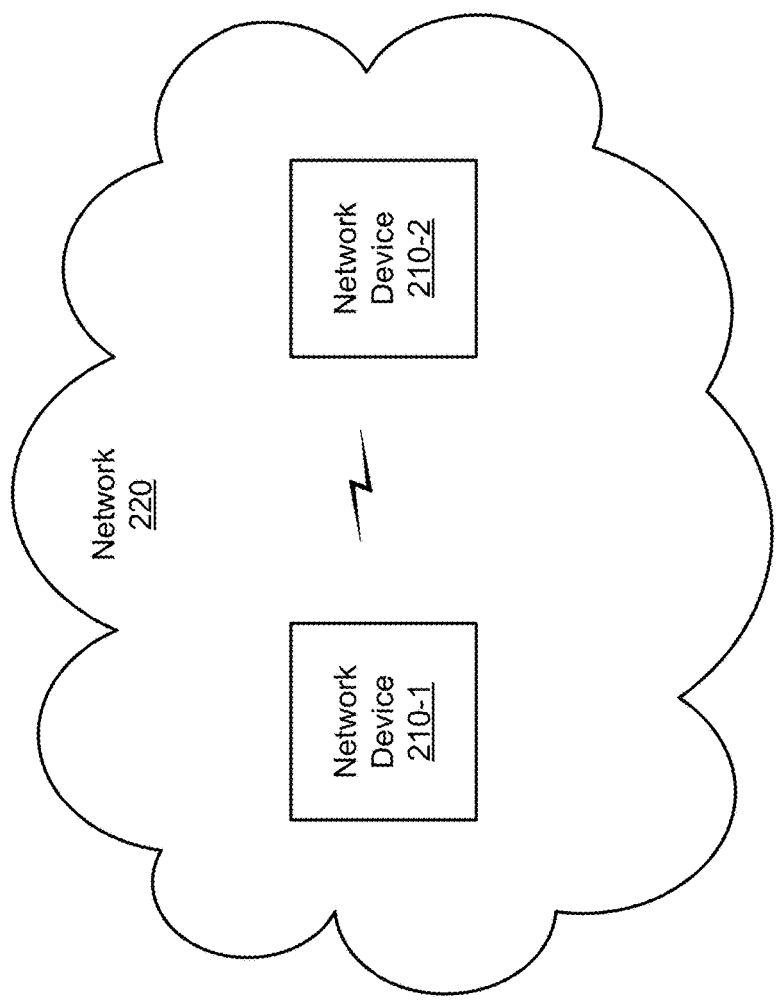
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include network device 210-1 and network device 210-2 (hereinafter referred to collectively as "network devices 210," and individually as "network device 210") and a network 220. Devices of environment 200 may interconnect via wired connections, wireless connections, or a combination of wired and wireless connections.

Network device 210 includes one or more devices capable of receiving, providing, storing, generating, and/or processing information. In some implementations, network device 210 may include a router, a switch, a gateway, a firewall device, a modem, a hub, a bridge, a policer, a network interface controller (NIC), a reverse proxy, a server (e.g., a proxy server), a multiplexer, a security device, an intrusion detection device, a load balancer, or a similar device. In some implementations, network device 210 may be implemented as a physical device implemented within a housing, such as a chassis. In some implementations, network device 210 may be implemented as a virtual device implemented by one or more computer devices of a cloud computing environment or a data center. In some implementations, network device 210 may correspond to a transmitting network device and/or a receiving network device. In some implementations, network device 210 may process, transmit, and/or receive a packet (e.g., a data packet, a probe packet, and/or the like)

Network 220 includes one or more wired and/or wireless networks. For example, network may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
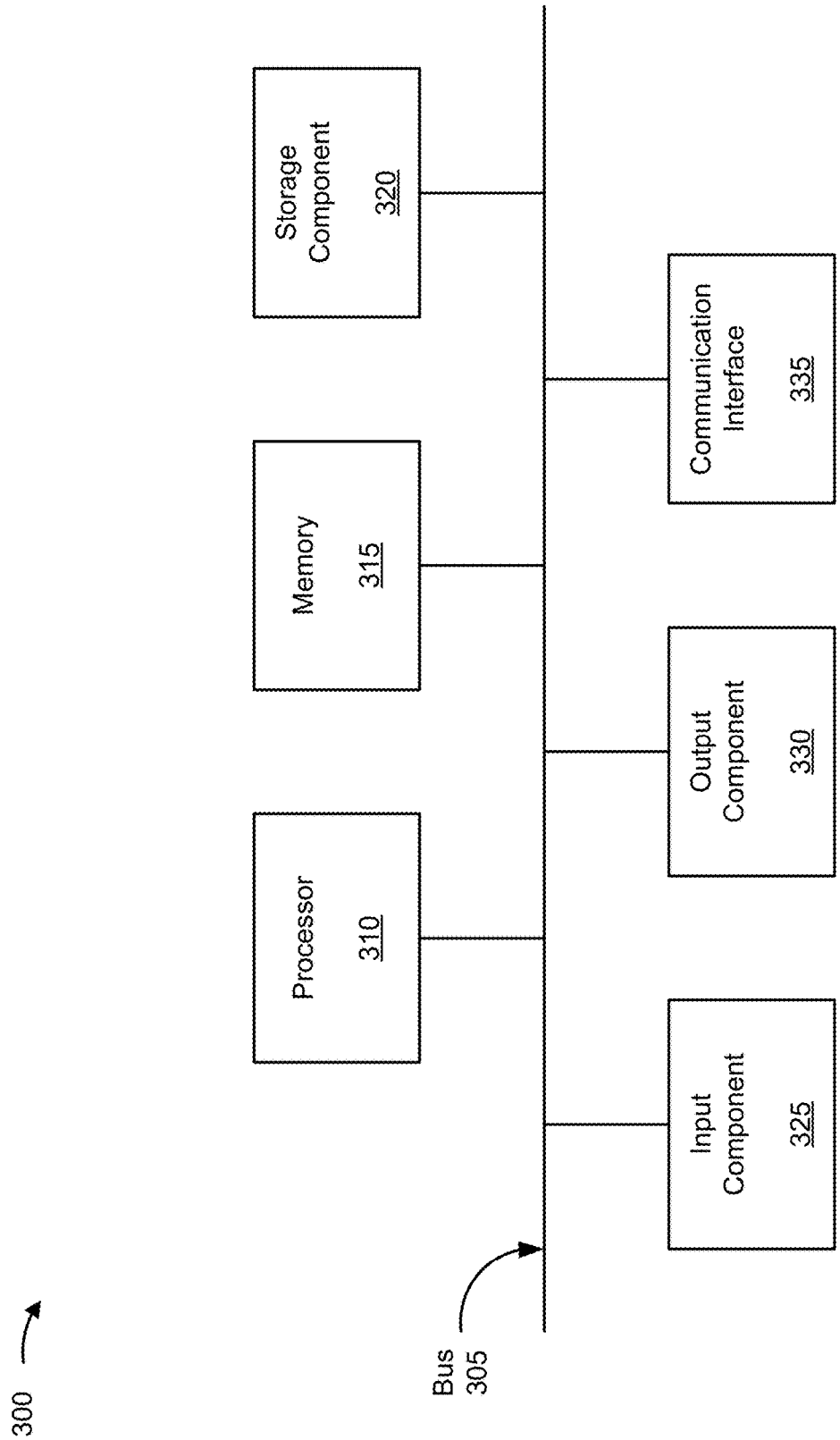
FIGS. 3A and 3B are diagrams of example components of one or more devices of FIG. 2.
Figure 3B:
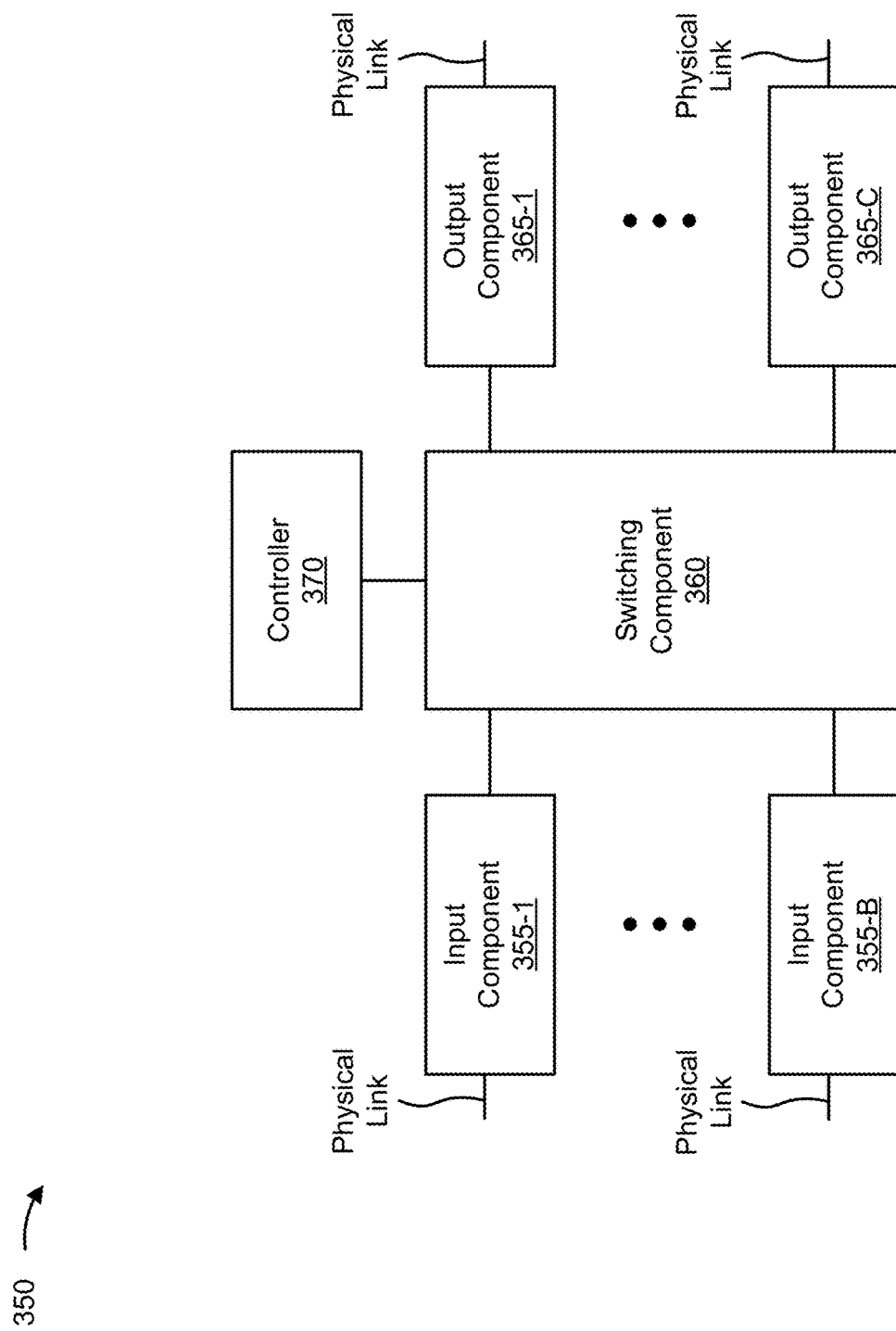

FIGS. 3A-3B are diagrams of example components of one or more devices of FIG. 2. FIG. 3A is a diagram of example components of a device 300. Device 300 may correspond to one or more of network devices 210, and/or the like. In some implementations, one or more network devices may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an ASIC, or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to one or more of network devices 210, and/or the like. In some implementations, one or more network devices may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input components 355 may be points of attachment for physical tunnels and may be points of entry for incoming traffic, such as packets. Input component 355 may process incoming traffic, such as by performing data tunnel layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical tunnels. Output component 365 may support data tunnel layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
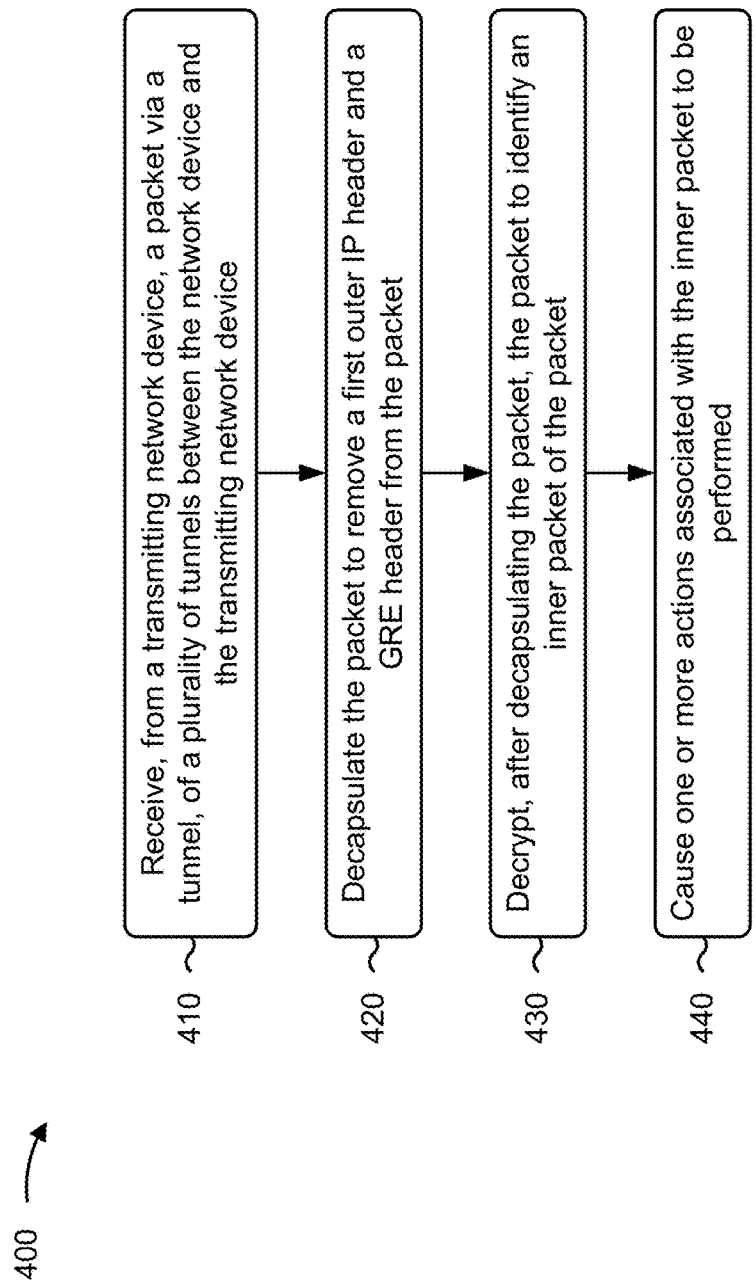

FIG. 4 is a flowchart of an example process 400 for transmitting multiple copies of an encrypted packet via multiple tunnels between a transmitting network device and a receiving network device. In some implementations, one or more process blocks of FIG. 4 may be performed by a network device (e.g., network device 210). In some implementations, one or more process blocks of FIG. 4 may be performed by another device or a group of devices separate from or including the network device, such as another network device.

As shown in FIG. 4, process 400 may include receiving, from a transmitting network device, a packet via a tunnel, of a plurality of tunnels between the network device and the transmitting network device (block 410). For example, the network device (e.g., using processor 310, memory 315, storage component 320, input component 325, output component 330, communication interface 335, input component 355, switching component 360, output component 365, controller 370, and/or the like) may receive, from a transmitting network device, a packet via a tunnel, of a plurality of tunnels between the network device and the transmitting network device, as described above. In some implementations, the packet includes a first outer IP header, a GRE header, a second outer IP header, an ESP header that provides encryption of an inner packet of the packet, and the inner packet. In some implementations, the inner packet is encapsulated by the ESP header, the ESP header is encapsulated by the second outer IP header, the second outer IP header is encapsulated by the GRE header, and the GRE header is encapsulated by the first outer IP header.

As further shown in FIG. 4, process 400 may include decapsulating the packet to remove a first outer IP header and a GRE header from the packet (block 420). For example, the network device (e.g., using processor 310, memory 315, storage component 320, input component 325, output component 330, communication interface 335, input component 355, switching component 360, output component 365, controller 370, and/or the like) may decapsulate the packet to remove a first outer IP header and a GRE header from the packet, as described above.

As further shown in FIG. 4, process 400 may include decrypting, after decapsulating the packet, the packet to identify an inner packet of the packet (block 430). For example, the network device (e.g., using processor 310, memory 315, storage component 320, input component 325, output component 330, communication interface 335, input component 355, switching component 360, output component 365, controller 370, and/or the like) may decrypt, after decapsulating the packet, the packet to identify an inner packet of the packet, as described above.

As further shown in FIG. 4, process 400 may include causing one or more actions associated with the inner packet to be performed (block 440). For example, the network device (e.g., using processor 310, memory 315, storage component 320, input component 325, output component 330, communication interface 335, input component 355, switching component 360, output component 365, controller 370, and/or the like) may cause one or more actions associated with the inner packet to be performed, as described above.

Process 400 may include additional implementations, such as any single implementation or any combination of implementations described below and/or in connection with one or more other processes described elsewhere herein.

In a first implementation, a source address of the first outer IP header identifies a physical tunnel endpoint of the transmitting network device, a destination address of the first outer IP header identifies a physical tunnel endpoint of the network device, a source address of the second outer IP header identifies a virtual tunnel endpoint of the transmitting network device, and a destination address of the second outer IP header identifies a virtual tunnel endpoint of the network device.

In a second implementation, alone or in combination with the first implementation, causing the one or more actions associated with the inner packet to be performed comprises identifying an IP header of the inner packet and a payload of the inner packet, wherein a source address of the IP header identifies a first local area network (LAN) associated with the transmitting network device and a destination address of the IP header identifies a second LAN associated with the network device, wherein the payload is encapsulated by the IP header, and sending the inner packet to the destination address of the IP header.

In a third implementation, alone or in combination with one or more of the first and second implementations, causing the one or more actions associated with the inner packet to be performed comprises updating a payload of the inner packet, and sending, via the tunnel, the inner packet to the transmitting network device.

In a fourth implementation, alone or in combination with one or more of the first through third implementations, process 400 includes identifying, after decapsulating the packet, a sequence number associated with the ESP header; and causing the sequence number to be stored in a data structure.

In a fifth implementation, alone or in combination with one or more of the first through fourth implementations, process 400 includes receiving, via a different tunnel, of the plurality of tunnels between the network device and the transmitting network device, an additional packet, wherein the additional packet includes an additional first outer IP header, an additional GRE header, an additional second outer IP header, an additional ESP header, and an additional inner packet, wherein the additional inner packet is encapsulated by the additional ESP header, the additional ESP header is encapsulated by the additional second outer IP header, the additional second outer IP header is encapsulated by the additional GRE header, and the additional GRE header is encapsulated by the additional first outer IP header; decapsulating the additional packet to remove the additional first outer IP header and the additional GRE header from the additional packet; identifying, after decapsulating the additional packet, a sequence number associated with the additional ESP header; obtaining, from a data structure, a sequence number associated with the ESP header; determining, based on the sequence number associated with the additional ESP header and the sequence number associated with the ESP header, that the additional inner packet is a copy of the inner packet; and causing, based on determining that the additional inner packet is a copy of the inner packet, the additional packet to be discarded.

In a sixth implementation, alone or in combination with one or more of the first through fifth implementations, process 400 includes identifying a sequence number associated with the ESP header and causing the sequence number and a copy of the inner packet to be stored in a data structure.

In a seventh implementation, alone or in combination with one or more of the first through sixth implementations, process 400 includes receiving, via a different tunnel, of the plurality of tunnels between the network device and the transmitting network device, an additional packet; decapsulating the additional packet to remove an outer IP header of the additional packet and a GRE header of the additional packet from the additional packet; identifying, after decapsulating the additional packet, a sequence number associated with an ESP header of the additional packet; obtaining, from a data structure, a sequence number associated with the ESP header of the packet; determining that the sequence number associated with the ESP header of the additional packet matches the sequence number of the ESP header of the packet; causing, based on determining that the sequence number associated with the ESP header of the additional packet matches the sequence number of the ESP header of the packet, the additional packet to be discarded; and generating, after causing the additional packet to be discarded, a new inner packet based on a copy of the inner packet of the packet stored in the data structure.

In an eighth implementation, alone or in combination with one or more of the first through seventh implementations, process 400 includes updating a payload of the new inner packet and sending, after updating the payload of the new inner packet, the new inner packet to the transmitting network device via the tunnel.

In a ninth implementation, alone or in combination with one or more of the first through eighth implementations, process 400 includes causing a sequence number of the ESP header and a copy of the inner packet to be stored together as an entry in a data structure; receiving, via a different tunnel, of the plurality of tunnels between the network device and the transmitting network device, an additional packet; determining that a sequence number associated with an ESP header of the additional packet matches the sequence number stored in the data structure; sending, via the different tunnel and based on determining that the sequence number associated with the ESP header of the additional packet matches the sequence number stored in the data structure, the copy of the inner packet stored in the data structure to the transmitting network device; and causing, after sending the copy of the inner packet stored in the data structure to the transmitting network device, the entry to be deleted from the data structure.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flowchart of an example process 500 for transmitting multiple copies of an encrypted packet via multiple tunnels between a transmitting network device and a receiving network device. In some implementations, one or more process blocks of FIG. 5 may be performed by a network device (e.g., network device 210). In some implementations, one or more process blocks of FIG. 5 may be performed by another device or a group of devices separate from or including the network device, such as another network device.

As shown in FIG. 5, process 500 may include encrypting a packet to create an encrypted packet (block 510). For example, the network device (e.g., using processor 310, memory 315, storage component 320, input component 325, output component 330, communication interface 335, input component 355, switching component 360, output component 365, controller 370, and/or the like) may encrypt a packet to create an encrypted packet, as described above. In some implementations, the encrypted packet includes an outer IP header that includes a source address that identifies a virtual tunnel endpoint of the network device and a destination address that identifies a virtual tunnel endpoint of a receiving network device.

As shown in FIG. 5, process 500 may include duplicating the encrypted packet to create a plurality of encrypted packets (block 520). For example, the network device (e.g., using processor 310, memory 315, storage component 320, input component 325, output component 330, communication interface 335, input component 355, switching component 360, output component 365, controller 370, and/or the like) may duplicate the encrypted packet to create a plurality of encrypted packets, as described above.

As further shown in FIG. 5, process 500 may include encapsulating, based on a tunneling protocol, each encrypted packet of the plurality of encrypted packets to create a plurality of encapsulated encrypted packets (block 530). For example, the network device (e.g., using processor 310, memory 315, storage component 320, input component 325, output component 330, communication interface 335, input component 355, switching component 360, output component 365, controller 370, and/or the like) may encapsulate, based on a tunneling protocol, each encrypted packet of the plurality of encrypted packets to create a plurality of encapsulated encrypted packets, as described above. In some implementations, each encapsulated encrypted packet includes an additional outer IP header that includes a source address that identifies a physical tunnel endpoint of the network device and a destination address that identifies a physical tunnel endpoint of the receiving network device.

As further shown in FIG. 5, process 500 may include sending each encapsulated encrypted packet, of the plurality of encapsulated encrypted packets, to a receiving network device via a respective tunnel of a plurality of tunnels between the network device and the receiving network device (block 540). For example, the network device (e.g., using processor 310, memory 315, storage component 320, input component 325, output component 330, communication interface 335, input component 355, switching component 360, output component 365, controller 370, and/or the like) may send each encapsulated encrypted packet, of the plurality of encapsulated encrypted packets, to a receiving network device via a respective tunnel of a plurality of tunnels between the network device and the receiving network device, as described above.

Process 500 may include additional implementations, such as any single implementation or any combination of implementations described below and/or in connection with one or more other processes described elsewhere herein.

In a first implementation, process 500 includes receiving, from the receiving network device, a modified version of the packet via a tunnel of the plurality of tunnels.

In a second implementation, alone or in combination with the first implementation, the packet is a probe packet that includes a UDP header and a synthesized data payload.

In a third implementation, alone or in combination with one or more of the first and second implementations, the packet is a data packet that includes a data payload and an IP header that includes a source address that identifies a first LAN associated with the network device and a destination address that identifies a second LAN associated with the receiving network device.

In a fourth implementation, alone or in combination with one or more of the first through third implementations, process 500 includes encrypting, using an ESP protocol, the packet to create the encrypted packet, wherein the encrypted packet includes the outer IP header and an ESP header.

In a fifth implementation, alone or in combination with one or more of the first through fourth implementations, encapsulating the encrypted packet, of the plurality of encrypted packets, to create the encapsulated encrypted packet comprises encapsulating, using a GRE tunneling protocol, the encrypted packet to create the encapsulated encrypted packet, wherein the encapsulated encrypted packet is including the additional outer IP header and a GRE header.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flowchart of an example process 600 for transmitting multiple copies of an encrypted packet via multiple tunnels between a transmitting network device and a receiving network device. In some implementations, one or more process blocks of FIG. 6 may be performed by a network device (e.g., network device 210). In some implementations, one or more process blocks of FIG. 6 may be performed by another device or a group of devices separate from or including the network device, such as another network device.

As shown in FIG. 6, process 600 may include receiving, from a transmitting network device, a packet via a GRE tunnel, of a plurality of GRE tunnels between the network device and the transmitting network device. For example, the network device (e.g., using processor 310, memory 315, storage component 320, input component 325, output component 330, communication interface 335, input component 355, switching component 360, output component 365, controller 370, and/or the like) may receive, from a transmitting network device, a packet via a GRE tunnel, of a plurality of GRE tunnels between the network device and the transmitting network device, as described above. In some implementations, the packet includes an inner packet that is encapsulated by an ESP section, which is encapsulated by a GRE section.

As further shown in FIG. 6, process 600 may include decapsulating the packet to remove a GRE section from the packet (block 620). For example, the network device (e.g., using processor 310, memory 315, storage component 320, input component 325, output component 330, communication interface 335, input component 355, switching component 360, output component 365, controller 370, and/or the like) may decapsulate the packet to remove a GRE section from the packet, as described above.

As further shown in FIG. 6, process 600 may include decrypting the packet to identify the inner packet (block 630). For example, the network device (e.g., using processor 310, memory 315, storage component 320, input component 325, output component 330, communication interface 335, input component 355, switching component 360, output component 365, controller 370, and/or the like) may decrypt the packet to identify the inner packet, as described above.

As further shown in FIG. 6, process 600 may include routing the inner packet based on a header included in the inner packet (block 640). For example, the network device (e.g., using processor 310, memory 315, storage component 320, input component 325, output component 330, communication interface 335, input component 355, switching component 360, output component 365, controller 370, and/or the like) may route the inner packet based on a header included in the inner packet, as described above.

Process 600 may include additional implementations, such as any single implementation or any combination of implementations described below and/or in connection with one or more other processes described elsewhere herein.

In a first implementation, the inner packet is a probe packet that includes a UDP header that indicates that the network device is to route the inner packet to the transmitting network device.

In a second implementation, alone or in combination with the first implementation, the inner packet is a data packet that includes an IP header that indicates that the network device is to route the inner packet to a LAN address, wherein routing the inner packet based on the header included in the inner packet includes routing the inner packet to the LAN address.

In a third implementation, alone or in combination with one or more of the first and second implementations, process 600 includes updating, prior to routing the inner packet, a payload of the inner packet to include information concerning when the network device received the packet and information concerning when the network device is to route the inner packet.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a network device and from a transmitting network device, a packet via a tunnel, of a plurality of tunnels between the network device and the transmitting network device,
        wherein the packet includes a first outer internet protocol (IP) header, a Generic Routing Encapsulation (GRE) header, a second outer IP header, an Encapsulating Security Payload (ESP) header that provides encryption of an inner packet of the packet, and the inner packet,
            wherein the inner packet is encapsulated by the ESP header, the ESP header is encapsulated by the second outer IP header, the second outer IP header is encapsulated by the GRE header, and the GRE header is encapsulated by the first outer IP header;
    decapsulating, by the network device, the packet to remove the first outer IP header and the GRE header from the packet;
    decrypting, by the network device and after decapsulating the packet, the packet to identify the inner packet; and
    causing, by the network device, one or more actions associated with the inner packet to be performed.

2. The method of claim 1, wherein a source address of the first outer IP header identifies a physical tunnel endpoint of the transmitting network device, and a destination address of the first outer IP header identifies a physical tunnel endpoint of the network device, and
    wherein a source address of the second outer IP header identifies a virtual tunnel endpoint of the transmitting network device, and a destination address of the second outer IP header identifies a virtual tunnel endpoint of the network device.

3. The method of claim 1, wherein causing the one or more actions associated with the inner packet to be performed comprises:
    identifying an IP header of the inner packet and a payload of the inner packet,
        wherein a source address of the IP header identifies a first local area network (LAN) associated with the transmitting network device and a destination address of the IP header identifies a second LAN associated with the network device,
            wherein the payload is encapsulated by the IP header; and
    sending the inner packet to the destination address of the IP header.

4. The method of claim 1, wherein causing the one or more actions associated with the inner packet to be performed comprises:
    updating a payload of the inner packet; and
    sending, via the tunnel, the inner packet to the transmitting network device.

5. The method of claim 1, further comprising:
    identifying, after decapsulating the packet, a sequence number associated with the ESP header; and
    causing the sequence number to be stored in a data structure.

6. The method of claim 1, further comprising:
    receiving, via a different tunnel, of the plurality of tunnels between the network device and the transmitting network device, an additional packet,
        wherein the additional packet includes an additional first outer IP header, an additional GRE header, an additional second outer IP header, an additional ESP header, and an additional inner packet,
            wherein the additional inner packet is encapsulated by the additional ESP header, the additional ESP header is encapsulated by the additional second outer IP header, the additional second outer IP header is encapsulated by the additional GRE header, and the additional GRE header is encapsulated by the additional first outer IP header;
    decapsulating the additional packet to remove the additional first outer IP header and the additional GRE header from the additional packet;
    identifying, after decapsulating the additional packet, a sequence number associated with the additional ESP header;
    obtaining, from a data structure, a sequence number associated with the ESP header;
    determining, based on the sequence number associated with the additional ESP header and the sequence number associated with the ESP header, that the additional inner packet is a copy of the inner packet; and
    causing, based on determining that the additional inner packet is a copy of the inner packet, the additional packet to be discarded.

7. The method of claim 1, further comprising:
    identifying a sequence number associated with the ESP header; and
    causing the sequence number and a copy of the inner packet to be stored in a data structure.

8. The method of claim 1, further comprising:
    receiving, via a different tunnel, of the plurality of tunnels between the network device and the transmitting network device, an additional packet;
    decapsulating the additional packet to remove an outer IP header of the additional packet and a GRE header of the additional packet from the additional packet;
    identifying, after decapsulating the additional packet, a sequence number associated with an ESP header of the additional packet;
    obtaining, from a data structure, a sequence number associated with the ESP header of the packet;
    determining that the sequence number associated with the ESP header of the additional packet matches the sequence number of the ESP header of the packet;
    causing, based on determining that the sequence number associated with the ESP header of the additional packet matches the sequence number of the ESP header of the packet, the additional packet to be discarded; and
    generating, after causing the additional packet to be discarded, a new inner packet based on a copy of the inner packet of the packet stored in the data structure.

9. The method of claim 8, further comprising:
    updating a payload of the new inner packet; and sending, after updating the payload of the new inner packet, the new inner packet to the transmitting network device via the tunnel.

10. The method of claim 1, further comprising:
causing a sequence number of the ESP header and a copy of the inner packet to be stored together as an entry in a data structure;
receiving, via a different tunnel, of the plurality of tunnels between the network device and the transmitting network device, an additional packet;
determining that a sequence number associated with an ESP header of the additional packet matches the sequence number stored in the data structure;
sending, via the different tunnel and based on determining that the sequence number associated with the ESP header of the additional packet matches the sequence number stored in the data structure, the copy of the inner packet stored in the data structure to the transmitting network device; and
causing, after sending the copy of the inner packet stored in the data structure to the transmitting network device, the entry to be deleted from the data structure.

11. A network device, comprising:
one or more memories; and
one or more processors to:
encrypt a packet to create an encrypted packet,
wherein the encrypted packet includes an outer internet protocol (IP) header that includes a source address that identifies a virtual tunnel endpoint of the network device and a destination address that identifies a virtual tunnel endpoint of a receiving network device;
duplicate the encrypted packet to create a plurality of encrypted packets;
encapsulate, based on a tunneling protocol, each encrypted packet of the plurality of encrypted packets to create a plurality of encapsulated encrypted packets,
wherein each encapsulated encrypted packet includes an additional outer IP header that includes a source address that identifies a physical tunnel endpoint of the network device and a destination address that identifies a physical tunnel endpoint of the receiving network device; and
send each encapsulated encrypted packet, of the plurality of encapsulated encrypted packets, to the receiving network device via a respective tunnel of a plurality of tunnels between the network device and the receiving network device.

12. The network device of claim 11, wherein the one or more processors are further to:
receive, from the receiving network device, a modified version of the packet via a tunnel of the plurality of tunnels.

13. The network device of claim 11, wherein the packet is a probe packet that includes a user datagram protocol (UDP) header and a synthesized data payload.

14. The network device of claim 11, wherein the packet is a data packet that includes a data payload and an IP header that includes a source address that identifies a first local area network (LAN) associated with the network device and a destination address that identifies a second LAN associated with the receiving network device.

15. The network device of claim 11, wherein the one or more processors, when encrypting the packet to create the encrypted packet, are to:
encrypt, using an Encapsulating Security Payload (ESP) protocol, the packet to create the encrypted packet,
wherein the encrypted packet includes the outer IP header and an ESP header.

16. The network device of claim 11, wherein the one or more processors, when encapsulating the encrypted packet, of the plurality of encrypted packets, to create the encapsulated encrypted packet, are to:
encapsulate, using a Generic Routing Encapsulation (GRE) tunneling protocol, the encrypted packet to create the encapsulated encrypted packet,
wherein the encapsulated encrypted packet includes the additional outer IP header and a GRE header.

17. A non-transitory computer-readable medium storing instructions, the instructions comprising:
one or more instructions that, when executed by one or more processors of a network device, cause the one or more processors to:
receive, from a transmitting network device, a packet via a Generic Routing Encapsulation (GRE) tunnel, of a plurality of GRE tunnels between the network device and the transmitting network device,
wherein the packet includes an inner packet that is encapsulated by an Encapsulating Security Payload (ESP) section, which is encapsulated by a GRE section;
decapsulate the packet to remove the GRE section from the packet;
decrypt, after decapsulating the packet, the packet to identify the inner packet; and
route the inner packet based on a header included in the inner packet.

18. The non-transitory computer-readable medium of claim 17, wherein the inner packet is a probe packet that includes a user datagram protocol (UDP) header that indicates that the network device is to route the inner packet to the transmitting network device.

19. The non-transitory computer-readable medium of claim 17, wherein the inner packet is a data packet that includes an internet protocol (IP) header that indicates that the network device is to route the inner packet to a local area network (LAN) address,
wherein the one or more instructions, that cause the one or more processors to route the inner packet based on the header included in the inner packet, cause the one or more processors to:
route the inner packet to the LAN address.

20. The non-transitory computer-readable medium of claim 17, wherein the one or more instructions, when executed by the one or more processors, further cause the one or more processors to:
update, prior to routing the inner packet, a payload of the inner packet to include information concerning when the network device received the packet and information concerning when the network device is to route the inner packet.

* * * * *